US010002480B2

(12) United States Patent
Richmond et al.

(10) Patent No.: US 10,002,480 B2
(45) Date of Patent: Jun. 19, 2018

(54) APPARATUS AND METHODS FOR ENTRY CONTROL OVER A CELLULAR NETWORK

(71) Applicant: DoorKing, Inc., Inglewood, CA (US)

(72) Inventors: Thomas R Richmond, Santa Ana, CA (US); Suzanne Richmond, San Pedro, CA (US); Patrick S. Kochie, Semi Valley, CA (US); Yu Jennifer Cheng, Santa Monica, CA (US); Eitan T. Bear, Santa Monica, CA (US); Nadejda V. Gueorguieva, Lomita, CA (US); Emmanuel G. Ceballos, Carson, CA (US)

(73) Assignee: DOORKING, INC., Inglewood, CA (US)

( * ) Notice: Subject to any disclaimer, the term of this patent is extended or adjusted under 35 U.S.C. 154(b) by 0 days. days.

(21) Appl. No.: 15/017,357

(22) Filed: Feb. 5, 2016

(65) Prior Publication Data

US 2017/0228950 A1 Aug. 10, 2017

(51) Int. Cl.
*H04M 11/00* (2006.01)
*G07C 9/00* (2006.01)
(Continued)

(52) U.S. Cl.
CPC ..... *G07C 9/00309* (2013.01); *G07C 9/00087* (2013.01); *G07C 9/00817* (2013.01);
(Continued)

(58) Field of Classification Search
CPC ............ G07C 9/00309; G07C 9/00087; G07C 9/00817; G07C 2009/0038;
(Continued)

(56) References Cited

U.S. PATENT DOCUMENTS

| 7,031,665 B1 * | 4/2006 | Trell | H04M 11/04 340/5.1 |
| 8,180,319 B2 * | 5/2012 | Nalley | H04W 64/00 455/404.1 |

(Continued)

*Primary Examiner* — Khai M Nguyen
(74) *Attorney, Agent, or Firm* — J. Mark Holland & Associates; J. Mark Holland; Alison Adnan

(57) ABSTRACT

Apparatus and methods for controlling physical access to a location include an entry system including at least one barrier at the physical location, with the barrier configured to selectively permit access into and/or from and/or within the physical location upon proper credentials and/or authorization. A cellular device is connected to or integrated with the entry system and is configured to transmit and receive voice and/or data information to the entry system that includes the credentials and/or authorization. The cellular device can be a retrofit to prior art/installed systems, can be external to an otherwise operational system, and/or can be integrated natively into the entry system. Methods and apparatus are disclosed to determine the power status and network link state of the cellular device and/or to establish communication through/to same, as well as for the cellular device to be connected to and control a plurality of entry systems and/or barriers. A plurality of entry systems and/or barriers can be controlled by one or more cellular devices, and the usage (and associated billing charges from cellular service providers) on any/all of those cellular devices monitored and selected to optimize (reduce) the expense of any data or other charges imposed by a cellular carrier associated with the cellular device. Optimization can include allocation to the aforementioned voice and/or data cellular plans related to specific of the plurality of entry systems and/or barriers.

9 Claims, 13 Drawing Sheets

(51) Int. Cl.
*H04W 4/02* (2018.01)
*H04M 1/725* (2006.01)
*H04W 4/14* (2009.01)
*H04M 15/00* (2006.01)

(52) U.S. Cl.
CPC ..... *H04M 1/7253* (2013.01); *H04M 15/8033* (2013.01); *H04W 4/021* (2013.01); *H04W 4/14* (2013.01); *G07C 2009/0038* (2013.01); *G07C 2009/00761* (2013.01); *G07C 2009/00793* (2013.01)

(58) Field of Classification Search
CPC ........... G07C 2009/00761; G07C 2009/00793; H04W 4/021; H04W 4/14; H04M 1/7253; H04M 15/8033
USPC ................................................ 455/406, 405
See application file for complete search history.

(56) References Cited

U.S. PATENT DOCUMENTS

| | | | |
|---|---|---|---|
| 9,049,306 B1* | 6/2015 | Gueorguieva | H04M 11/007 |
| 2011/0076988 A1* | 3/2011 | Zigman | G07C 9/00031 |
| | | | 455/411 |
| 2014/0049372 A1* | 2/2014 | Ortiz | G06Q 10/06 |
| | | | 340/5.64 |
| 2015/0279130 A1* | 10/2015 | Robertson | G07C 9/00571 |
| | | | 340/5.61 |

* cited by examiner

APPARATUS AND METHODS FOR ENTRY CONTROL OVER A CELLULAR NETWORK

INCORPORATION BY REFERENCE

This application incorporates by reference DoorKing's U.S. Pat. No. 9,049,306 issued on Jun. 2, 2015 for "Apparatus and Methods for Remote Control of Access to Facilities", and U.S. patent application Ser. No. 14/727,647 filed on Jun. 1, 2015 for "Apparatus and Methods for Remote Control of Access to Facilities." The contents of those materials are incorporated by reference as if expressly stated herein.

FIELD OF THE INVENTION

The present invention relates generally to entry control systems. More specifically, the present inventions relate to apparatus and methods for controlling entry to a physical location over a cellular network. Among other things, the inventions provide for a cellular device connected to an entry system associated with the physical location, wherein the cellular device is configured to transmit and receive voice and/or data information over the cellular network, and to communicate that data to the entry system for control of entry into and/or travel/access within the physical location.

BACKGROUND

Modern facilities often need and/or use some form of an electronic/automated/remote entry system to control entrance/access to the facility. By way of example, and not by way of limitation, such facilities/physical locations include apartment complexes, gated communities, condominium buildings, private residences, college resident halls, office buildings, factories, industrial sites, athletic clubs, and other secured locations. Among other things, such entry systems can provide a necessary or helpful level of security for the controlled location, as well as other benefits.

Also by way of example and not by way of limitation, one type of access control system or entry system commonly in use at present is a telephone entry system (TES). These TES systems include at least one telephone line operatively connected to the system to provide a communication and/or control means between the TES system and persons wanting to gain and/or allow access to the location. Among other applications, these TES systems are commonly mounted adjacent the entrances of physical locations such as the entrances of buildings and/or at vehicle gates into complexes. The telephone line permits persons such as visitors to dial a specific resident within a complex, for example, and permits a resident to enter a code (such as by pressing a number on their telephone) to open a gate controlled by the TES entry system and/or unlock a TES-controlled door, etc. at which the visitor is waiting.

In addition to enabling tenants or residents to remotely open a gate/door for a visitor, such entry systems can provide security and access control in other ways. For example, tenants are commonly given passcodes (which can be entered at a keypad on or near the entry), proximity cards, remote "rolling code" transceivers, or other devices. These are some of the wide variety of technologies that exist and/or are being developed to allow those tenants (or other persons to whom such authorizations and/or devices are given) access to a particular facility, building, complex, community, or similar physical location.

Such entry systems can control entry at one or more entry points (for example, doors, gates, garage doors, gates, and similar structures) associated with a particular secured location, complex or facility, for example. The entry system may also monitor the connected/controlled entry points for unauthorized access, keep records of persons entering or leaving a secured area, and/or perform other functions. The secured areas can include a complex generally and/or specific areas of a complex (such as a swimming pool or community clubhouse/entertainment area).

Such controlled installations commonly involve a plurality of tenants, residents, visitors, vendors, or other users who need access into and/or out of a controlled area. Each of these authorized users can have associated codes/passwords/signaling devices/telephone numbers (for visitors to dial to request entry), and/or other data that must be available to enable the convenient and desired entry and exit in the secured area, while maintaining the desired security. Both the users and their control devices and related information can be varied and changing, such as when tenants move out and/or into the facility.

To manage all of that information, these systems typically include an electronic database. In many early systems, the data/database resided only on the gate controller or door controller unit itself. To update and maintain that data, the end user had to physically go to that control point/system and manually enter/update the data (typically via a keypad).

More recently, and especially as personal computers have become readily available and more economic, these entry systems have evolved to allow end users to manage the data/database from a "remote" location, rather than having to go to the control point/TES system itself and manually update the data. These improved systems allow the end users to manage their respective database without having to be "at" the access control device (gate/door controller, etc.). Commonly, this was accomplished by including in a remote database management/control system an analog modem at the control point (commonly built into the door/gate controller itself), with the modem providing a way to upload/download/maintain data in the relevant database, without having to be "at" the physical site of the TES. During installation, the telephone line at the control point (the one that was already needed and used to allow visitors to "call" tenants to obtain entrance to the facility) also is connected to the modem. This arrangement typically allows such systems to provide both the telephone and modem functions on that single line, because the amount of time needed for modem activity over the telephone line (for database maintenance) typically is relatively small. Thus, without adding to the existing monthly telephone line charges for the control system, the end user can enjoy the benefits of remotely managing the database information on the control system.

As indicated above, such "remote" control systems need a way to communicate between the end user's system and the controller box or unit located "remotely" from the end user. Typically, the necessary data update is provided by establishing direct communication between two analog modems. This may be accomplished via a modem on an end user's personal computer or "server" modem to which the end user's personal computer connects to dial directly into the modem on the remote controller. Thus, typical prior art communication occurs directly over a conventional telephone line, between (1) the user modem or modem to which the user connects, and (2) the controller modem. These prior art systems are described in DoorKing's above-referenced patent and application, and are expressly incorporated herein by reference.

For several reasons, setting up and maintaining the desired data/database communication through that conventional pathway ((1) user modem/(2) telephone line/(3) controller modem) can be complicated, and notably, the technology which supports that conventional modem-modem communication pathway has become outdated as technology has evolved. Among other things, many computer manufacturers no longer install hardware modems on general purpose computers, and instead use software that simulates modems. Newer technologies provide faster, more reliable data connections than the analog modem and thus, these technologies such as fiber optics, DSL, and others are replacing conventional analog modems and manufacturers are phasing out production of modems.

Another issue for communicating using analog modems is the demise of the telephone land line. As technology continues to advance, the archaic telephone land line is being phased out in favor of newer technologies such as cellular, voice over IP, fiber optic, and cable, among others. Among other things, land lines conventionally used for TES installations can be relatively unsightly and/or complicated to bury underground or route to/from the TES location, and can be subject to water, weather, and/or other damage.

Accordingly, it is desirable to provide methods and apparatus that improve and/or simplify the installation and maintenance and use of TES systems and the communication of data to and from such systems.

BRIEF DESCRIPTION OF THE DRAWINGS

The present inventions will become apparent from the textual description considered in connection with the accompanying drawings. It should be understood, however, that the drawings are intended for the purpose of illustration and not as limits of the invention. In other words, the present invention is illustrated by way of example, and not by way of limitation, in the text and the figures of the accompanying drawings. In those drawings, like reference numerals generally refer to similar elements.

DETAILED DESCRIPTION

Figure 1:
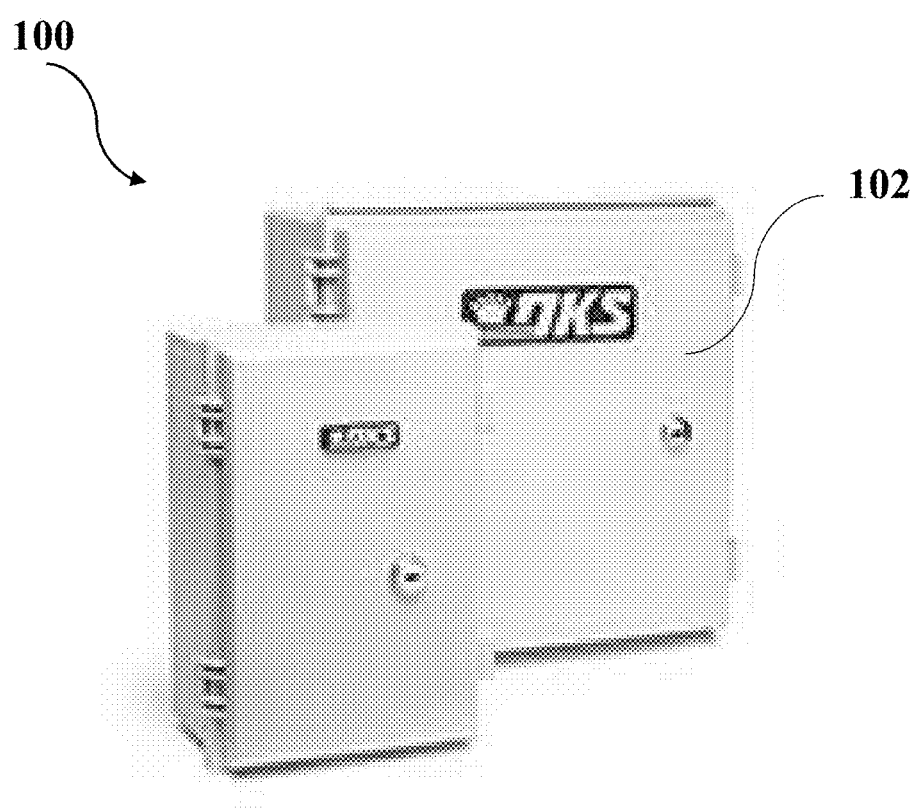
FIG. 1 shows a cellular device, in accordance with preferred embodiments of the present invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that certain embodiment(s) of the invention(s) may be practiced without these specific details. In other instances, well-known structures and devices are shown in representative block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" or "the invention" or "the inventions" refers to any one of the embodiments of the invention described herein, and any lawfully-covered equivalents. Furthermore, reference to various feature(s) of the "present invention" throughout this document does not mean that all claimed embodiments or methods must include the referenced feature(s).

In a preferred embodiment of the invention, the present inventions provide apparatus and methods for controlling physical access to a physical location, including a TES having at least one barrier at the physical location, with the barrier configured to selectively permit access into and/or from and/or within the physical location upon proper credentials and/or authorization. A cellular device is connected to and/or integrated into the TES and is configured to transmit and receive voice and/or data information to the TES, including credentials and/or authorization for actuating (opening) the barrier. The cellular device may be a retrofit to prior art/installed systems, may be external to an otherwise operational system, and/or may be integrated natively into the TES. Methods and apparatus are disclosed to determine the power status and network link state of the cellular device and/or to establish communication through/to same, as well as for the cellular device to be connected to and control a plurality of entry systems and/or barriers. A third party remote computer/server can be interposed between the end user and the user's TES, for numerous benefits such as described in DoorKing's aforementioned patent/application (and other benefits such as discussed herein, including pooling the costs and billing charges from cellular service companies for the cellular connections/services associated with the TES installations of the present inventions). A plurality of entry systems and/or barriers can be controlled by one or more cellular devices, and the usage on any/all of those cellular devices monitored and selected to optimize (reduce) the expense of any data or other charges imposed by a cellular carrier associated with the cellular device. Optimization can include allocation to the aforementioned voice and/or data cellular plans related to specific of the plurality of entry systems and/or barriers.

System Setup

Figure 2A:
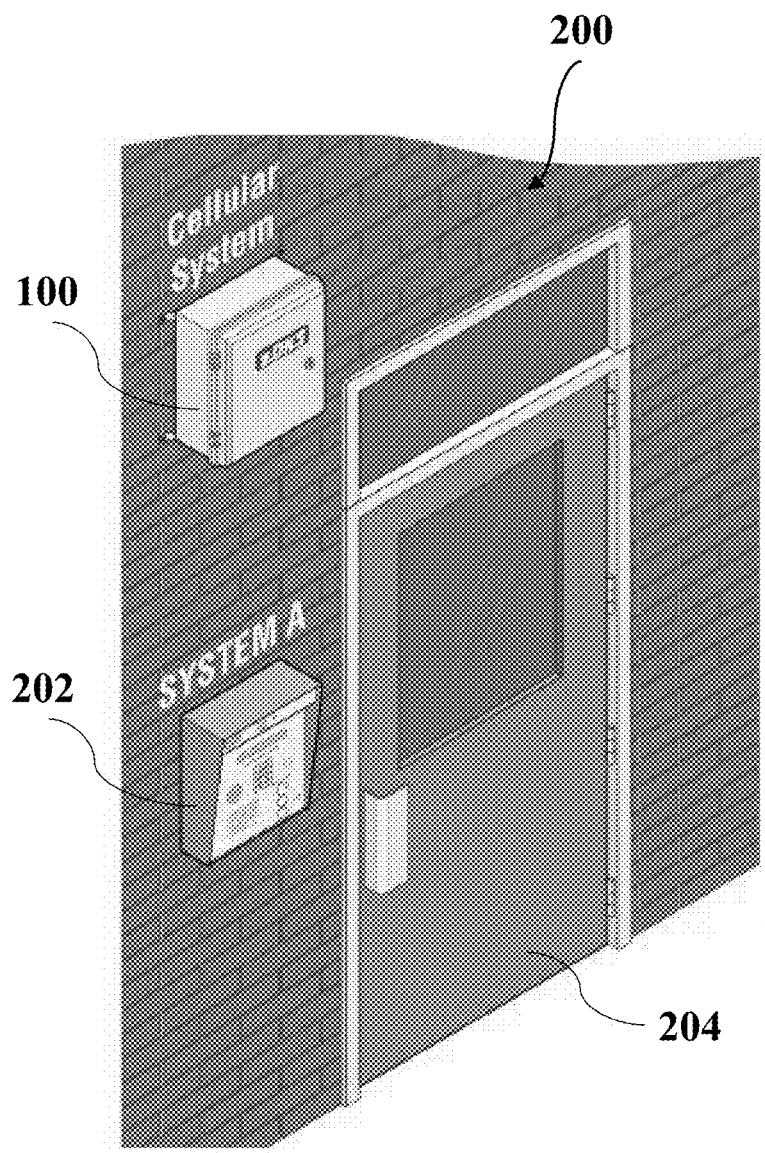
FIGS. 2A and 2B show a cellular device installed or mounted nearby a telephone entry system (TES)/entry system.
Figure 2B:

In a preferred embodiment of the present invention, a cellular radio, generally referred to herein as a cellular device 100, such as that shown in FIG. 1, may be deployed near the location of an entry system such as a TES 202. As shown in FIGS. 2A and 2B, a cellular device 100 contained within a protective housing or box 102 may be installed at a location of a TES 202, such as near to the exterior components of an entry system 202. Persons of ordinary skill will appreciate that certain components of the entry system 202 may be installed within a protective barrier/housing or at another nearby location for protection from the elements, for example. Such exterior components may include, for example, a call box containing a keypad for controlling entry into a facility 204. Persons of ordinary skill in the art will appreciate that the setup and configuration of the external cellular device 100 and the external components of the entry system 202 may vary from that shown in the figures, and that the possible configurations in which the cellular device 100 and entry system 202 are installed are virtually limitless. The configurations shown in the figures are merely examples. Further, persons of ordinary skill will understand that the cellular device 100 may be deployed internally of the entry system 202 and may be integrated natively into the entry system 202 such that the cellular device 100 functions as an integral part of the entry system 202. A separate or external cellular device 100 may provide a benefit in that older/previously installed entry systems 202 may be retrofitted with a cellular device 100 in order to update that otherwise "vintage" entry system 202 with cellular service.

Integrated System

In a preferred embodiment of the present invention, the cellular device 100 may communicate both voice and data information to the entry system 202. In essence, the cellular device 100 may function as the interface between the entry system 202 and a cellular carrier of a cellular network, providing the entry system 202 with the capacity to communicate wirelessly, rather than through a telephone land line.

Preferably, the cellular device 100 is connected to the printed circuit board (PCB) of the entry system 202 such that the microprocessor of the entry system 202 may control the cellular device 100. In a preferred embodiment, the cellular device 100 may be configured with a microprocessor capable of interfacing with the entry system 202 microprocessor. Standard microprocessor interface buses known in the art may include SPI, IC2, UART, or other known interfaces. Such interfaces may allow the entry system's 202 microprocessor to control the cellular device's 100 modem, for example, by communicating setup commands, commands to dial a specific phone number, commands to answer an incoming call, commands to send and receive cellular data, and any number of other commands necessary for a cellular voice and/or data connection.

Preferably, voice communication with the cellular device 100 may occur over analog and/or digital connections. In a preferred embodiment, in a cellular device 100 having both analog voice inputs and outputs, the cellular device 100 is capable of converting analog signals to digital signals. This is necessary since the modern day cellular network is entirely digital. Preferably, digital interfaces between the cellular device 100 and processor of the entry system 202 and/or its voice processing software may include PCM (Pulse-code modulation, a method used to digitally represent sampled analog signals), however, persons of ordinary skill will appreciate that this may change as digital technology improves/evolves and the inventions may be practiced with other such technologies.

External Cellular Device

Figure 3:
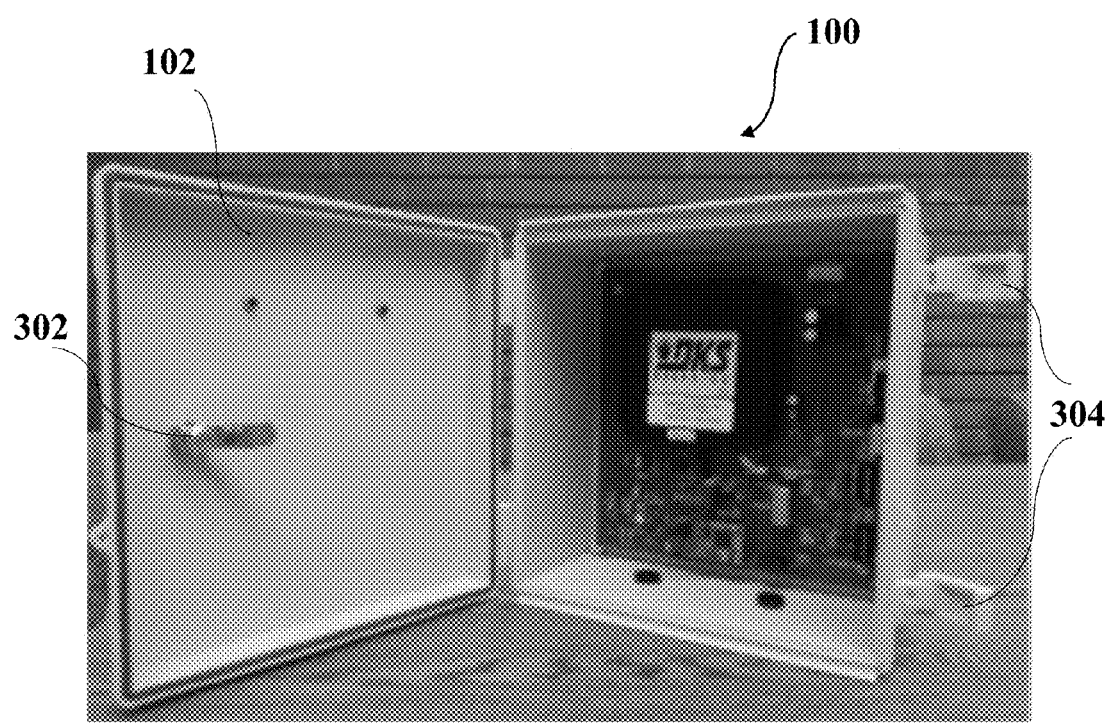
FIG. 3 shows a cellular device contained within a protective enclosure, the enclosure being opened to expose the contents of the cellular device.

In a preferred embodiment of the present invention, the cellular device 100 may be contained within a protective housing/enclosure 102 and installed near the entry system 202. As shown in FIG. 3, the internal components of the cellular device 100 may be containing within the protective housing/box and latches 304 and/or locks 302 may be provided on this protective enclosure 102 to protect the internal components from damage and/or potential tampering.

Preferably, the cellular device 100 contains a microprocessor capable of interfacing with the microprocessor of the entry system 202. Voice and/or data interfaces may be provided between the cellular device 100 and entry system 202. To generate a phone land line simulation for any installation or use with a "vintage" "land line" TES 202, a SLIC (Subscriber Line Interface Circuit) interface may be provided along with an analog or digital voice interface. A data interface may preferably be provided as a means for sending data/database information between the entry system 202 and the cellular device 100. Preferred digital interfaces/communication links include Ethernet connections, USB connections, RS232 connections, RS422 connections, and/or UART connections, among others.

In alternative embodiments of the invention, a cellular router containing all of the components of the cellular device 100 may be provided and installed, within the protective enclosure of the cellular device 100 or otherwise. The advantage of the cellular router is that it may provide a cellular microprocessor, a digital to analog voice interface, an SLIC interface for generating a simulated telephone line, and a data interface all within a single module. This may avoid the hassle of the existing TES 202 having to undergo the rigorous and time-consuming compliance testing that is required by the U.S. government and cellular carriers for the cellular device 100.

Details of the External Cellular Radio

Figure 4:
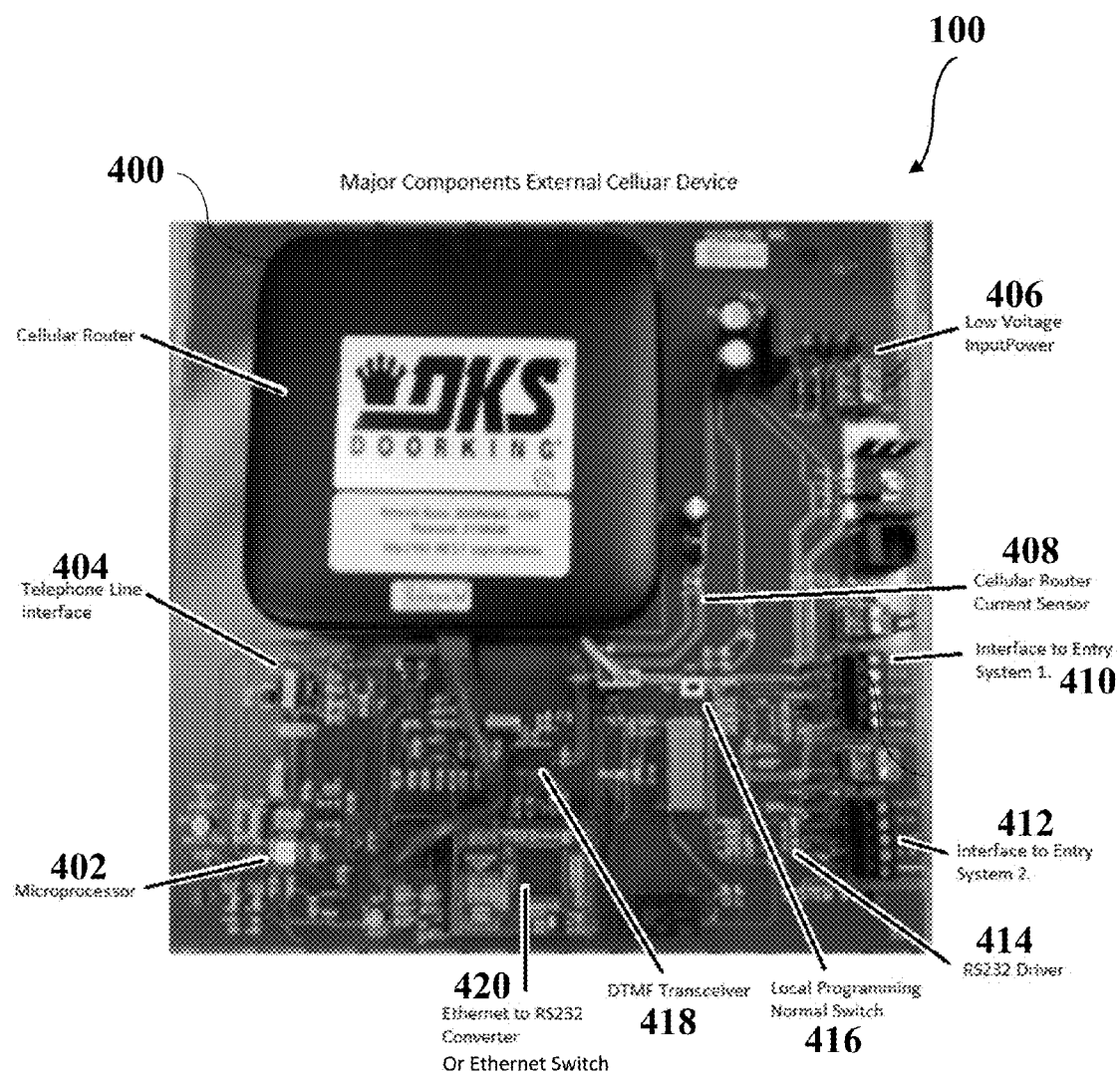
FIG. 4 shows the main internal components of a cellular device in accordance with an embodiment of the present invention.

FIG. 4 shows details of the main components of one of the many embodiments of the cellular device 100. A cellular router 400, such as that described above, may handle voice and/or data connections, communications, interfaces, conversions, etc. A power supply may be provided to provide power to the cellular router 400 and the cellular device 100 itself. Preferably, the microprocessor 402 handles any and/or all "housekeeping" issues of the cellular device 100. A telephone line interface 404 allows for programming of the cellular device 100 as needed. This telephone line interface 404 may also provide a connection between the simulated phone land line of the cellular device 100 and the entry system 202. Further, a data interface 410/412 is preferably provided between the cellular router 400 of the cellular device 100 and the entry system 202. As indicated above, this data interface 410/412 may include and/or consist of an Ethernet connection, RS232 connection, RS422 connection, and/or UART connection, among others, depending on the interface provided in the entry system 202. An incoming ring detection circuit preferably allows the cellular device 100 to respond to incoming telephone calls. As further discussed below, a dual-tone multi-frequency (DTMF) decoding circuit 418 preferably is provided so that the cellular device 100 may respond to incoming commands having a DTMF signal, commonly transmitted over telephone land lines. A sensor, such as a current sensor 408, may be provided for sensing whether the cellular router 400 and/or cellular device 100 is powered on or off. Further, a sensor which detects whether the entry system 202 is in the middle of a telephone call to a resident, for example, may be provided within the cellular device 100.

Preferred Features of the External Cellular Device

As discussed herein, a preferred feature of the present inventions is the ability to mimic an analog modem/telephone land line. Therefore, preferably there are checks in place to monitor the status of the cellular device 100 and to be sure that it is working and/or ready to receive/communicate information (just as a conventional land line connection would provide). These checks preferably may include, but are not limited to the following:

1. Check that the cellular router 400 of the cellular device 100 is powered on. Preferably, this is accomplished by monitoring an electrical current drawn by the cellular router 400, and if/when the electrical current drops below a specified level, the power may be refreshed or renewed (or the power "recycled") to the cellular router 400 in order to restore power to the device. The microprocessor 402 of the cellular device 100 is configured to monitor the electrical current drawn by the cellular router 400.

2. Another check to monitor that status of the cellular router 400 (i.e., powered on or off) is to monitor the Ethernet status of the router 400. The microprocessor 402 of the cellular device 100 is also capable of monitoring this Ethernet status. If, during monitoring of the Ethernet status, the router 400 is powered off, the microprocessor 402 may sense that there is no Ethernet activity, and that signal may be used to force a refresh or renewal of power to the router 400.

3. If a data connection of the cellular router 400 is inactive for a predetermined extended period of time (for example, for 15 hours, 24 hours, etc.), a cellular carrier of the cellular network in which the data connection is established may abandon or turn that data connection off (this is in contrast to land line connections, which typically are never turned off). This may occur in many embodiments and installations of the inventions because, for example, an end user may not need to send/receive data/database information to/from the TES 202 actively (so the TES 202/cellular device 100 may be inactive for an extended period of time). To address this "disconnected" status issue, certain embodiments of the present inventions provide for a programmable software timer which runs in the microprocessor 402. The timer may be programmed to turn the router 400 off and back on (i.e., refresh or renew or "recycle" the power to the router 400) after a set period of time (e.g., every 12 hours), and thus "force" or reestablish the router's data connection over the cellular network. Preferably, this refreshing/renewing of power to the router 400 will only occur when the TES 202 and/or the cellular router/phone is not in use (to avoid the resulting interruption of making a call, controlling a barrier 204 to a facility, and/or communicating data or otherwise actuating the TES 202. In addition, preferably the cellular device 100 is capable of sensing activity/use by the associated TES 202 and postponing the renewal of power if the TES 202 system is busy.

4. In another preferred check, if the cellular router 400 loses its data connection to the cellular data network at any time, the cellular device 100 may be called from an external device, in order to reestablish a data connection. Preferably, the cellular device 100 is configured to "answer" the call and receive a DTMF command. The command may be for the microprocessor 402 to refresh or renew the power to the router 400, and thus reestablish a data connection. Typically, this may occur if an external server (as prompted by an end user) attempts to connect and communicate data/database information to/from the entry system 202. If, when attempting to connect with the entry system 202, the connection cannot be made, the external server may call the cellular device 100 and issue this command to renew power. After a period of time has lapsed since the attempt, the server may again attempt the data transfer.

5. Another "check" may be provided by the cellular connection timer mentioned above. Preferably, data which is communicated through the cellular router 400 will renew or refresh the cellular connection timer. In this manner, the microprocessor 402 of the cellular device 100 may periodically send data information in order to renew/reset the timer.

6. Alternatively, an external computer or server may send data over the cellular network to either the entry system 202 or microprocessor 402 of the cellular device 100 in order to refresh or renew or reset the cellular connection timer.

7. A further alternative check involving the cellular connection timer may include sending an SMS/text message to the microprocessor 402 of the cellular device 100 in order to renew or reset the cellular connection timer. An SMS/text message sent to the cellular device 100 may instruct the microprocessor 402 of the cellular device 100 to send a small amount of data which will in turn renew the cellular connection timer.

Programming the External Cellular Device

Figure 5:
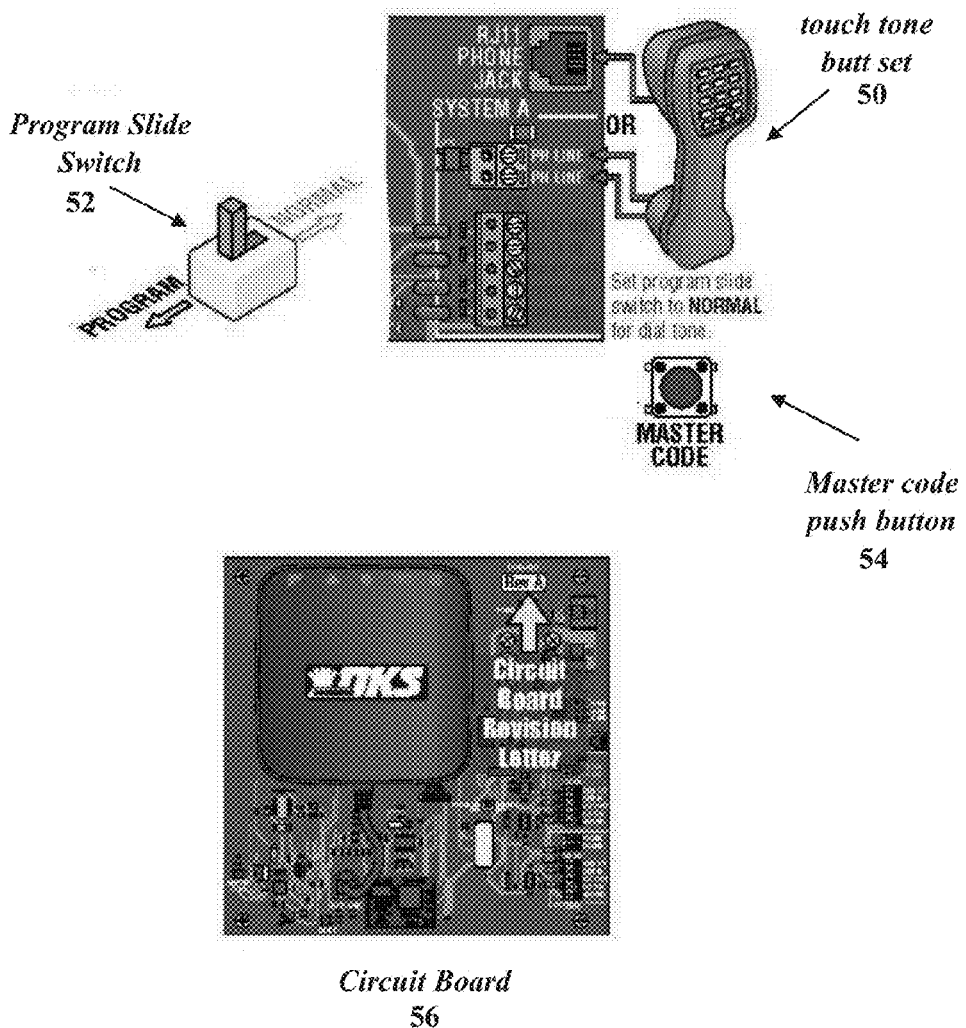
FIG. 5 shows some of the preferred functions which may be programmed into the cellular device.
Figure 5:
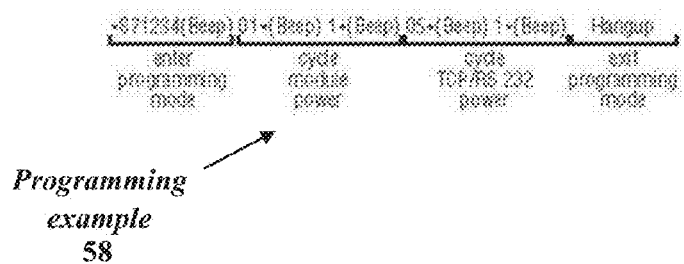

In certain preferred embodiments of the present invention, a number of different features/functions may be programmed in the cellular device 100. FIG. 5 shows some of the preferred features which may be programmed into the cellular device 100 to perform different functions. To program those features/functions in the cellular device 100, any suitable technology and/or technique may be used. In current cellular device 100 technology, there are many ways in which to communicate programming commands to the cellular device 100. Persons of ordinary skill will understand that the following list of programming options are merely illustrative of the capabilities of an exemplary cellular device 100, and that as technology advances and evolves and end users require/need other features/functionality, the present inventions may be practiced with further programming options that may be provided for programming the cellular device 100. At present, programming the cellular device 100 may include at least the following:

1. A standard touch tone telephone may be used to program the cellular device 100 locally. In a preferred embodiment, the cellular device 100 may be "switched" into a "program" mode, which may disconnect the cellular phone line from the system and connect a phone power supply to the phone that is performing the programming step. In this manner, any DTMF signals received by the programming phone in order to program the cellular device 100 will not be mistakenly received by the cellular router 400 and possibly dialed as a phone number for the entry system 202 to control access.

2. In another embodiment, programming commands may be sent remotely via a call to the cellular device 100. In this case, a remote telephone may call the cellular device 100 and issue DTMF commands in order to program the cellular device 100.

3. In a further embodiment, the microprocessor 402 of the cellular device 100 may be connected to a third data channel such as an Ethernet to RS232 converter module 420 for connecting to the entry system 202 using an RS232 connection. In this way, programming commands may be sent as data information over the cellular data network so long as a data connection is established and connected at the time of data transfer.

4. In addition, in another preferred embodiment, SMS/text messages may be sent to the cellular device 100 and used to issue programming commands.

5. Further, since the cellular router 400 of the cellular device 100 typically supports WiFi (wireless Internet connection), the cellular device 100 may be programmed with any device that connects wirelessly to the Internet, such as a laptop computer, tablet, desktop, smartwatch, smartphone, etc.

In a preferred embodiment of the present invention shown in FIG. 5, a preferred method of programming the cellular device may include at least some of the following apparatus and/or steps. Among other things, the Voice/Data Cellular System can be programmed for certain maintenance features. Normally these do not need to be set or adjusted. This programming can be done locally at the cellular system itself using a touch tone butt set 50 as a programming tool or remotely by calling the cellular system using a touch tone telephone.

Program Slide Switch 52—Slide this switch to program when programming the board LOCALLY using a touch tone telephone. Be sure to switch back to Normal when finished programming. Cellular voice will NOT work with program slide switch set to PROGRAM.

Below are following details for a preferred apparatus/methods, normally involving a programming switch 52 that is set to "program" mode:

1. To set the master code for voice/data cellular system: Connect a touch tone phone to System A phone terminals. Press and release the master code push button 54. Enter on the phone the new 4 digit master code and then press *. A tone should be heard in the phone ear piece. The new master code is now programmed. Hang up the phone to end programming. The cellular system's master code must be the same as System A's master code. Set the slide switch back to normal if done, or leave in "program" mode if more programming will be done.

2. To cycle power to the cellular module: This will cycle power to the cellular module if power is ON or it will turn ON the module if it is OFF. This allows the module to re-connect with the cellular network. Press *87 Master Code (Beep) 01*(Beep) 1*(Beep) to cycle power or 0*(Beep) to NOT cycle power.

3. To set TCP/RS 232 Factory Defaults: This will RESET the TCP/RS 232 module back to factory defaults. Press *87 Master Code (Beep) 02*(Beep) 1*(Beep) to reset defaults or 0*(Beep) to NOT reset defaults.

4. To cycle power to cellular module schedule: This schedules the number of days between automatic power cycling of the cellular module. This allows the module to re-connect with the cellular network after periods of non-usage. The revision letter of a specific circuit board 56 will restrict programming to either "number of days-Rev A ONLY" or "number of hours-Rev B or higher".
  i. "Rev A" Circuit Board ONLY, "0-9" number of days: 0=no cycle, 1=every day, 2=every two days, 3=every three days, etc. (up to every 9 days). The default setting is every 3 days. To program, press *87 Master Code (Beep) 03*(Beep) 0-9*(Beep) number of days to cycle power.
  ii. "Rev B or higher" Circuit Boards, "00-99" number of hours: 00=no cycle, 01=every hour, 02=every two hours, 03=every three hours, etc. (up to every 99 hours). The default setting is every 3 hours. To program, press *87 Master Code (Beep) 03*(Beep) 00-99* (Beep) number of hours to cycle power.

5. To set the number of rings to answer a call: Sets the number of rings for an incoming call before the cellular system will answer. 2=two rings, 3=three rings, etc. (up to 9 rings). By default, the system will answer on the second ring. In this case the cellular system will listen in for DTMF tones. If received, the cellular system will stay on the line for programming while the system will hang up. If any other DTMF tones are received, the cellular system will ignore them. If the system does not answer on the second ring, the cellular system will answer on the programmed number of rings. The default setting is 5 rings. To program, press *87 Master Code (Beep) 04*(Beep) 2-9*(Beep) number of rings before answering call.

6. To set TCP/RS 232 Power Cycle: Sometimes it is necessary to cycle power to the TCP/RS 232 module to re-establish an Ethernet connection to the cellular module. Press *87 Master Code (Beep) 05*(Beep) 1*(Beep) to cycle power to TCP/RS 232 module or 0*(Beep) to not cycle power. Once the master code has been keyed in and programming mode is entered, it is possible to program multiple functions without leaving the programming mode. Just complete one program step and then go to the next. FIG. 5 includes Programming Example 58 as an example, in which the master code is 1234: Cycle power to the cellular module and then cycle power to the TCP/RS 232 module. The cellular system will remember the commands received and execute them in order when program mode is exited.

External Cellular Device Status

For embodiments of the inventions in which the microprocessor 402 is connected to a channel on the Ethernet to RS232 converter 420, the processor 402 is available to communicate over the cellular data network. The processor 402 may report to an external computer/central server the status of the external cellular device 100. Data can include things such as temperature, power supply voltage, number of entry system 202 phone calls made, duration of the calls made, Ethernet status, and various other parameters. These may be reported back to a central server in any convenient and suitable manner. SMS (Text) messages may also be used to report the status of the cellular device 100. These messages may be sent to an external computer/server which is able to be analyzed by service personnel. Preferably, this external computer/server may sent alerts via email or SMS message, or other methods to service personnel alerting them to problems with the external cellular devices 100. These alerts may also be sent directly, bypassing a central computer/server via email or SMS messages to service personnel.

Installation of the External Cellular Device

In a preferred embodiment of the present invention, the external cellular device 100 may be installed/mounted in a location that is nearby the entry system 202 with which it communicates. This design enables the elimination of a telephone land line which previously connected the entry system 202 to a facility's phone junction box. In prior art systems connected to phone junction boxes, electrical wiring and conduits had to be installed between the TES 202 and phone junction boxes, and those junction boxes could potentially be very far away from the desired location for the TES 202 installation. Therefore, these installations of prior art entry systems 202 and telephone wires could be very costly, time consuming, and potentially hazardous to have electrical wires running over long distances. The present invention eliminates those hassles by preferably having the cellular phone/device installed very close by or even "in" the TES 202 itself.

Preferably, the cellular device 100 may be connected to the entry system 202 in several ways, each allowing the cellular system to be the interface for the TES 202. At present, the cellular device 100 may be connected to the entry system 202 or a plurality of entry systems 202 by a phone line, a data connection (Ethernet, RS232 or other data connection), and/or by a low voltage power connection 406. The power may be supplied in any suitable manner, including (by way of example) by the entry system 202 itself or an external low voltage power supply module 406.

More than One Entry System Connected to One External Cellular Device

As previously mentioned, a single cellular device 100 may be connected to and serve as the interface for a plurality of entry systems. Particularly, a facility may have more than one entry point each controlled by a separate TES 202, and one cellular device 100 may support all of the entry systems 202 for that particular facility. Persons of ordinary skill will appreciate that the cellular device 100 may support any number of entry systems 202, and that those entry systems need not necessarily be associated with the same facility/entrance/end user/etc. for the cellular device 100 to provide a communication channel for those entry systems 202.

In a preferred embodiment wherein a cellular device 100 supports more than one/a plurality of entry systems 202, a telephone line may be shared between more than one entry system 202. In such embodiments, the cellular device 100 may have separate data connections for each entry system 202 so that data information is not crossed or lost between different entry systems 202 supported by the one cellular device 100. Preferably, the separate data connections for each entry system 202 are logically different from each other so that data may be sent separately to each entry system 202 simultaneously.

In embodiments where an Ethernet connection is used for data communication/transmission, the cellular device 100 may include a "switch" which allows for data to be transmitted to one of the plurality of TES 202 systems. In embodiments where an RS232 data connection is used, the Ethernet output of the cellular router 400 may be connected to an Ethernet-to-RS232 converter 420. This converter may support multiple RS232 entry system 202 ports and may route the RS232 data to the proper entry system 202.

With respect to the voice connection for each entry system 202 in configurations where a cellular device 100 supports a plurality of entry systems 202, a cellular voice connection (i.e., telephone line) may be shared between the entry systems 202. In this manner, the telephone/voice connection interface of the cellular device 100 may be routed to more than one entry system 202. Preferably, the entry systems 202 are capable of supporting telephone line sharing, wherein an entry system 202 within the system can detect if another entry system 202 is busy/using the telephone line. In this case, the external cellular device 100 supports one voice "channel" so that the entry systems 202 must wait in a queue to use the channel if another entry system 202 is using the channel.

Local Testing of the External Cellular Device

Due to the potential complexity of the architecture of the system as a whole, and sometimes as a matter of good practice, it is advantageous to have in place ways to test the cellular device 100 and its connection to the entry system(s) 202 and the associated hardware (e.g., wiring between the two). Preferably, any WiFi-enabled device may "check" the status of the cellular router 400 since the external device is configured to support WiFi as well. This may be accomplished using any WiFi-enabled device running a specific program or "app" that may send test data to and from the entry system 202. "Tests" such as these may confirm and/or diagnose the connectivity of hardwire connections between the cellular device 100 and the entry system(s) 202 and may test and/or report on software settings of the entry system 202.

Block Diagram of the External Cellular Device's Circuitry

Figure 6:
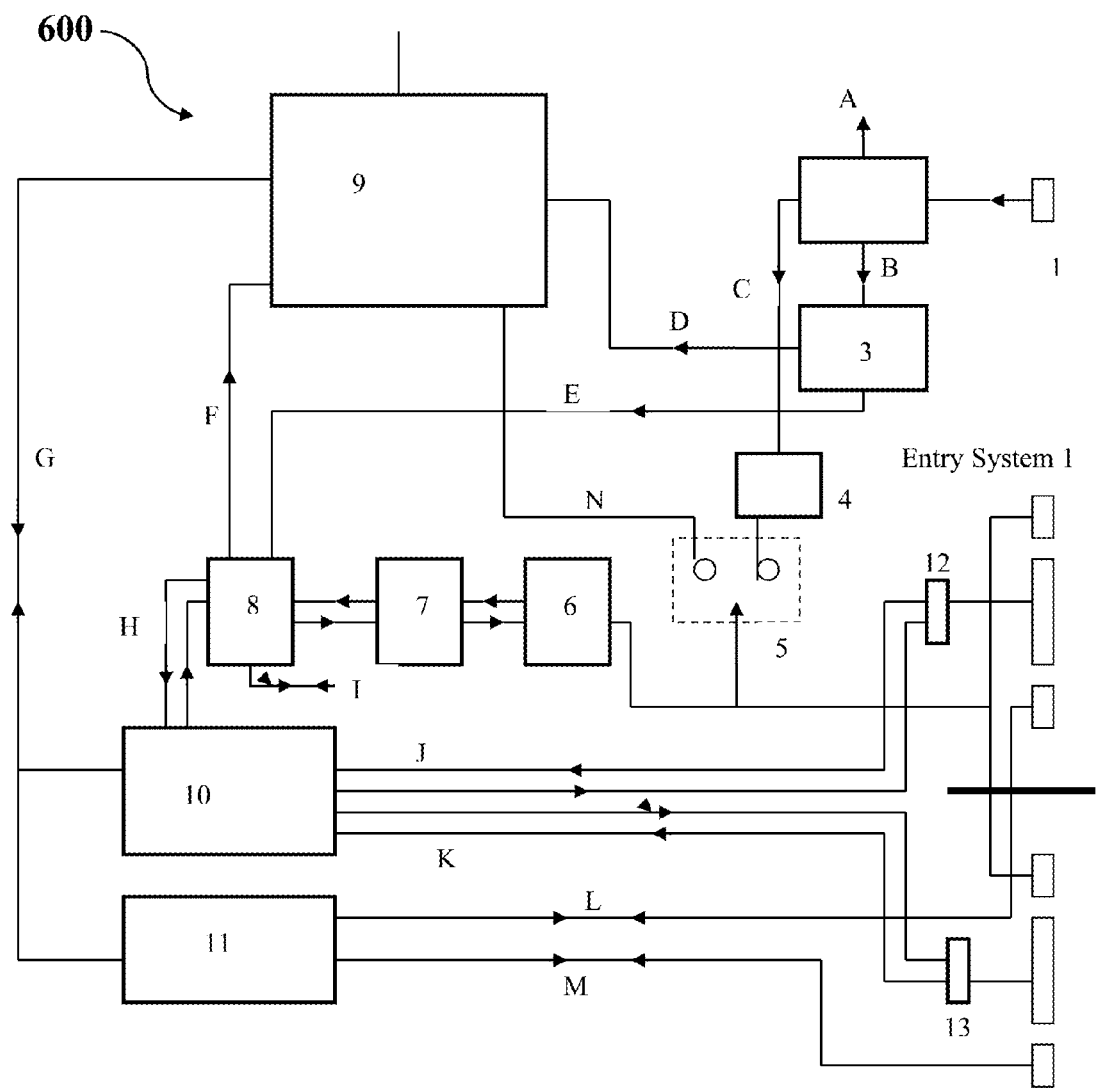
FIG. 6 is a circuit diagram of the cellular device.

FIG. 6 shows a block diagram of one of the many potential embodiments a cellular device's 100 circuitry 600 in connection with the present inventions. As shown in the figure, the cellular device 100 includes the following components: low voltage power supply input (1) to power the cellular device; low voltage power supply outputs (2) (+5 VDC output to power all circuits on the PCB (A), +5 VDC output to power the cellular router current sensor (B), 12 VDC output to power the local phone telephone interface); cellular router current sensor (3) (output to cellular router (D), analog measurement to microprocessor (E)); local telephone power supply (4) for local programming with touch tone phone; manual switch (5) to select cellular router simulated phone line (N) or local phone power supply (used when programming locally with touch tone phone); telephone line interface DAA (6); DTMF Receiver/Generator (7); Microprocessor (8) (inputs from various sensors (I), from DTMF transceiver current sensor (E), ON/OFF control to cellular router (F), serial data bus to Ethernet converter (H), cellular router input power (D), simulated phone line (N), Ethernet (G), ON/OFF control (F)); Ethernet to RS232 converter (10) (3 RS232 channels, Ethernet input (G), serial data bus to entry system 1 (J), serial data bus to entry system 2 (K)); Ethernet switch (11) (Ethernet to entry system 1 (L), Ethernet to entry system 2 (M)); RS232 driver/receiver (12); RS232 driver/receiver (13)

Cellular System Internal to the Telephone Entry System

As previously mentioned, the cellular device 100 may be provided as an integral component of the entry system 202. Such embodiments of the invention provide potential advantages and disadvantages. Advantages include not needing to mount or provide power to a separate cellular device 100, not having extra wiring between the cellular device 100 and the entry system 202, and being able to program locally via the keypad provided on the entry system 202, rather than having to use a touch tone telephone to achieve same. Disadvantages of an integral cellular device 100 include a cellular antenna which may be more prone to vandalism when mounted to the entry system's 202 enclosure, the cellular antenna needing to be mounted remote of the entry system 202 if a poor cellular signal exists (in this case wiring to the antenna from the system would need to be protected in a conduit, for example), and the cellular device 100 in such embodiments can only readily support one entry system 202 (the TES 202 into which it is integrated).

Cellular Network Design

Figure 7:
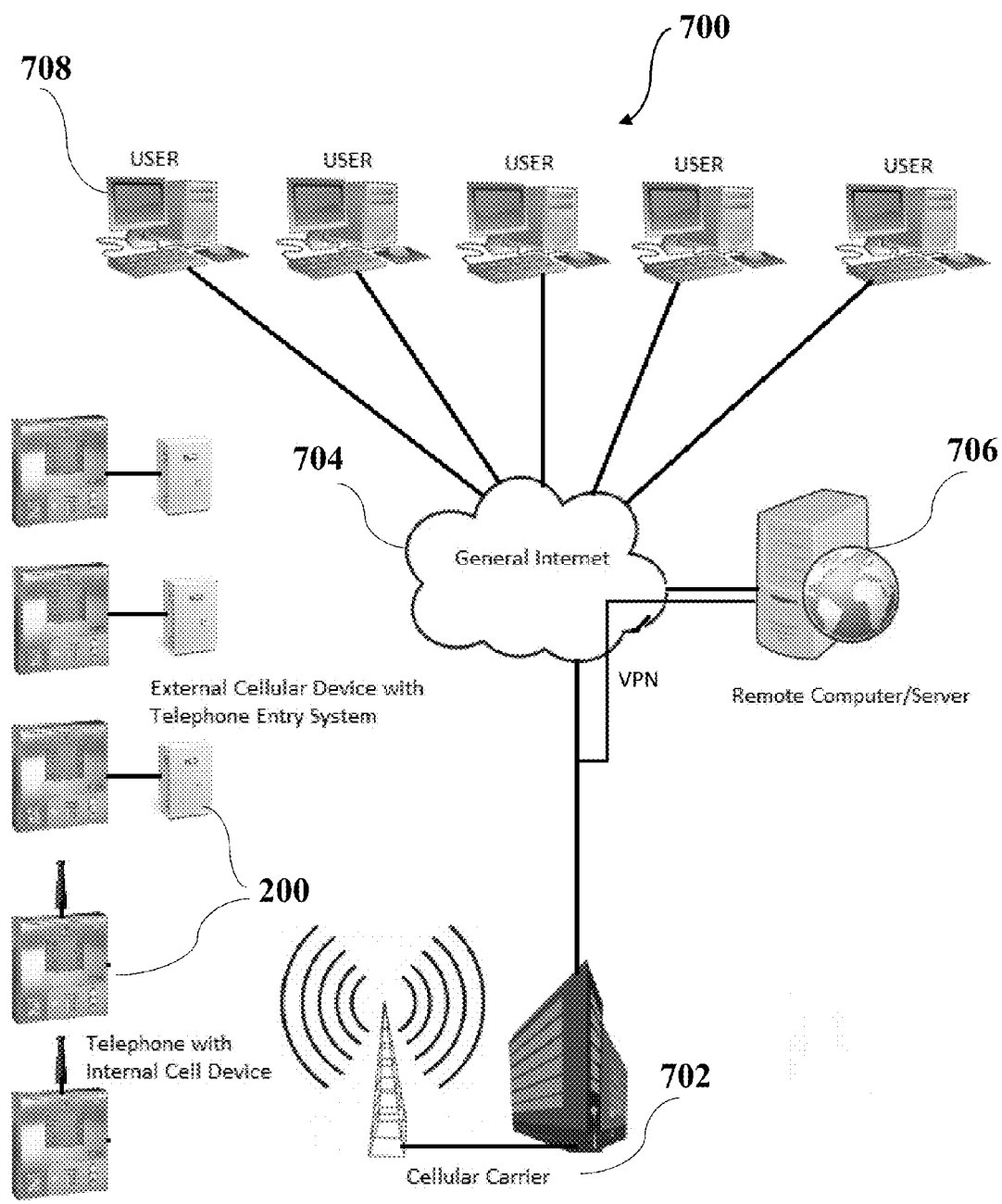
FIG. 7 shows the general architecture of an entry system and cellular device being connected to a cellular network.

In a preferred embodiment of the present invention, data is sent/received to/from a TES 202 over a cellular network 700. FIG. 7 shows the architecture of an example of a cellular network 700 having a remote computer/server and entry system/cellular device system 200 connected with it.

Server Based

In certain embodiments of the present invention, the cellular device 100 and TES 202 together preferably function in a server role, while a remote communication server 706 functions in a "client/user" capacity, including by sending/requesting data information from the TES/cellular device 200 ("server"). In this manner, in order for the client (remote communication server 706) to connect to the TES 202, it must know the IP address of the TES/cellular device 200 (this is not an issue for land line systems, as they do not use IP addresses). Therefore the IP address of the telephone entry system 202 must be "known" to the client, that IP address must not change as long as the client is associated with that particular entry system 202. Preferably, to provide this "static" address to the TES/cellular device 200, the TES 202 is assigned to a virtual private network (VPN) within the cellular network 700, such as an Access Point Name (APN). This private network allows for the transfer of data information to and from entry systems/cellular devices 200 functioning as "servers". Further, the remote communication servers 706 functioning as clients are also assigned to this APN on the private network so that the two systems may communicate without interruption or unwanted interaction from the general cellular network 700 with which they connect. In addition, a large number of private static "mobile terminated" IP addresses may be assigned to this APN.

SIM Card

In a preferred embodiment, each cellular device 100 on a cellular network is identified by a unique identifying number, such as by installing a SIM (subscriber identity module) card in the cellular device 100. The SIM card contains unique numbers that identify a particular cellular device 100 and distinguish it from any other cellular device 100 that may exist. Preferably, this SIM card may be designated to the APN of the cellular network for the entry system connected to the cellular device 100. Further, the SIM card may be assigned one of the private static IP addresses of the APN. In this manner, the SIM card installed in the cellular device/entry system 200 ("server") and the APN being assigned to the cellular device 100, will function to dedicate the cellular device 100 to the APN for the entry system 202 on the cellular network.

DTMF Tone Signaling Issues/Solutions, Over a Cellular Network

Another aspect of the present invention relates to the aforementioned DTMF (dual tone multi frequency) and issues that occur because of differences between land line and cellular network services. DTMF is the signal to the phone company that is generated when a user presses an ordinary telephone's touch keys. In the United States and perhaps elsewhere, it is known as "Touchtone" phone tones. There is a distinct tone associated with each of the telephone keys, and those generated tones can be sensed and used for various purposes.

Conventional remote access control systems have used (and continue to use) DTMF tones (albeit over land lines) to allow users to send signals or other data through the land lines, for purposes such as authorizing the gate/door/other thing to open and allow a person or vehicle to enter the controlled premises. As explained below, although conventional DTMF signals tend to transmit and work satisfactorily on land lines, the voice channel of cellular networks typically is not favorable to the transmission of DTMF signaling tones. The present inventions include apparatus and methods to address that problem and permit satisfactory uses of DTMF even over access control systems that use cellular communication devices.

Comparison of the Standard Land Line Telephone Line to the Cellular Network

Among other things, this DTMF problem relates to data capacity. Analog signals from a land line telephone are typically converted to a digital bit stream at the telephone company central office for transmission digitally throughout the rest of the telephone network. The analog signal is sampled 8000 times per second with each sample out being 8 bits. This results in a 64,000 (64K) bits per second data stream. This is called "toll quality speech" and is the standard by which all other voice conversion methods are compared. In the industry, this is also called designated as "g.711" encoding.

This is a relatively high bit rate conversion, and it does a very good job of accurately representing the speech signal along with other types of signaling on a telephone network. Examples of such other signaling are DTMF tones (discussed here), dial tone, modem signals, fax signals, etc.

A disadvantage of this high bit rate conversion is that it requires a relatively large data capacity within the telephone network to transmit this data, especially for many simultaneous calls. This becomes an issue on cellular carrier networks, because a given cell radio tower has only a relatively limited capability (compared to land lines) to handle a certain number of simultaneous calls. The total number of simultaneous calls is determined, at least in part, by the data rate each call requires. Thus, by reducing the data rate for each call, the cellular carrier 702 increases the number of calls that may be processed at any given time by a given tower. Cellular carriers 702 therefore are motivated to reduce the data rate of the cellular calls, so that they have to install fewer towers.

To reduce the data rate needed to transmit voice calls, various alternatives to the g.711 encoding have been developed. Some of these methods can reduce the data rate needed to as low as 5000 bits per second. Complex algorithms process the speech so that the voice quality is acceptable at these low data rates. However, although these lower data rate encoding schemes produce voice signals that still are of acceptable quality, the schemes can unacceptably distort and introduce noise to other signals such as DTMF.

The cellular carriers recognized this problem. For example, the carriers recognized that DTMF was still widely used to navigate company PBX systems, phone in bank systems, and any number of other existing systems that require DTMF tone recognition for navigation through the outside service. In order for cellular phones to be used for those purposes, the cellular carriers needed to enable DTMF signaling over their cellular devices 100.

The cellular carriers created special systems within the cellular networks that allow acceptable DTMF signaling for outbound calls (calls being placed FROM cellular phones). In the special systems, the carriers added DTMF tone generators connected to their outgoing telephone lines which connect to the public land line telephone network. "Out of band" signaling is used to trigger the DTMF tone generators. These digital "out of band" signals are not distorted by the low bit rate voice encoders on the cellular network. Example: A cellular user calls to a company and must navigate an automated attendant PBX using DTMF tones. When the automated attendant requests that a DTMF tone be sent, the cellular users presses the appropriate keypad button on their cellular phone. Unlike a land line phone, however, the cellular phone itself does not generate a DTMF tone. Instead, the cellular phone sends a digital "out of band" signal to a DTMF tone generator connected to the outgoing telephone line. This digital "out of band" signal commands the DTMF generator to output the appropriate tone. In this way, the DTMF tone is generated "outside" of the cellular network and is therefore not distorted by the low bit rate voice encoders on the cellular network.

Although the cellular carrier's DTMF tone generators are useful for generating outgoing DTMF tones, they are not useful for processing "incoming" tones over the cellular systems. In other words, for a DTMF signal to be received by a cellular device 100, that signal has to go through the aforementioned methods that reduce the data rate to as low as 5000 bits per second and distort the signal. Thus, when a telephone entry system 202 is connected using a cellular network, the system cannot reliably receive and use incoming DTMF tones through that connection, and may not be able to reliably use DTMF tones for control and operation of the system.

Here is an example of the problem. A hypothetical telephone entry system (TES 202) may be supplied its telephone line by the External Cellular device 100, as described elsewhere in this disclosure. When a visitor uses the TES 202, the TES 202 makes a telephone call over that cellular device 100 to a resident of a property served by the TES 202. The resident answers the visitor's call and wants to allow the visitor to enter. So far, so good, regardless of whether the resident himself is using a land line or cellular telephone. The DTMF problem occurs when the resident presses the appropriate DTMF button on their phone. This action causes the resident's phone to generate a DTMF tone (again, this occurs whether the resident's phone is land line or cellular, as the latter uses the outgoing DTMF tone generators as described above). This DTMF tone propagates through the public telephone system, and again, so far, so good. The actual problem specifically occurs when that DTMF signal is passed to the cellular system and eventually to the entry system. Because the tone was generated outside the cellular system, before being passed to the cellular system it is processed through the aforementioned methods that reduce the data rate to as low as 5000 bits per second and distort the signal. From that point on, as far as the cellular connection at the TES 202 (where the visitor is located, hoping to gain entry to the premises), the signal is a distorted unreliable incoming tone. In other words, the cellular portion of the TES 202 process degrades the DTMF tone, and the aforementioned "outgoing" tone generators do not correct the problem.

In short, the resident's DTMF tone is converted by the low bit rate encoders used on the cellular network, so that when the signal reaches the TES 202 it is noisy and distorted. The distortion and noise may be enough that the DTMF tone decoding within the TES 202 will be unable to recognize the DTMF tone and will not unlock the door/gate/etc., and will not allow the visitor to enter. This defeats one of the main purposes of the TES 202.

The reliability problem exists at least in part because of DTMF limitations in conventional TES 202 technology. Existing telephone entry systems 202 (typically using land lines, so that they do not have the distortion/noise problems mentioned above in connection with cellular systems) use a variety of methods to decode DTMF tones. Some use integrated circuits designed for this function. Others use microprocessors running software to accomplish the same function. Most (or even all of which the inventors are aware) use standard methods well known in the industry. These traditional TES 202 DTMF decoding schemes rely on the fact that the DTMF signal will come "in" from a land line, and therefore will contain at most a relatively small amount of noise and distortion. When normally used on land lines with toll quality voice encoding, the noise and distortion is quite low, and conventional TES 202 systems are able to use DTMF signals reliably.

Figure 8A:
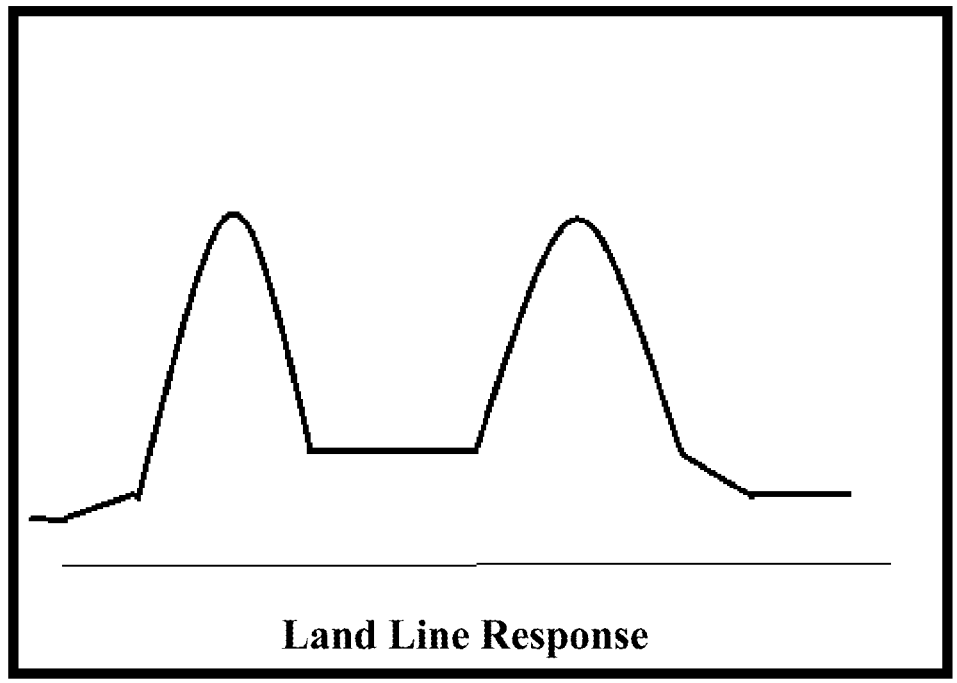
FIGS. 8A and 8B show frequency domain plots of a land line response (FIG. 8A) compared to a cellular response (FIG. 8B).
Figure 8B:
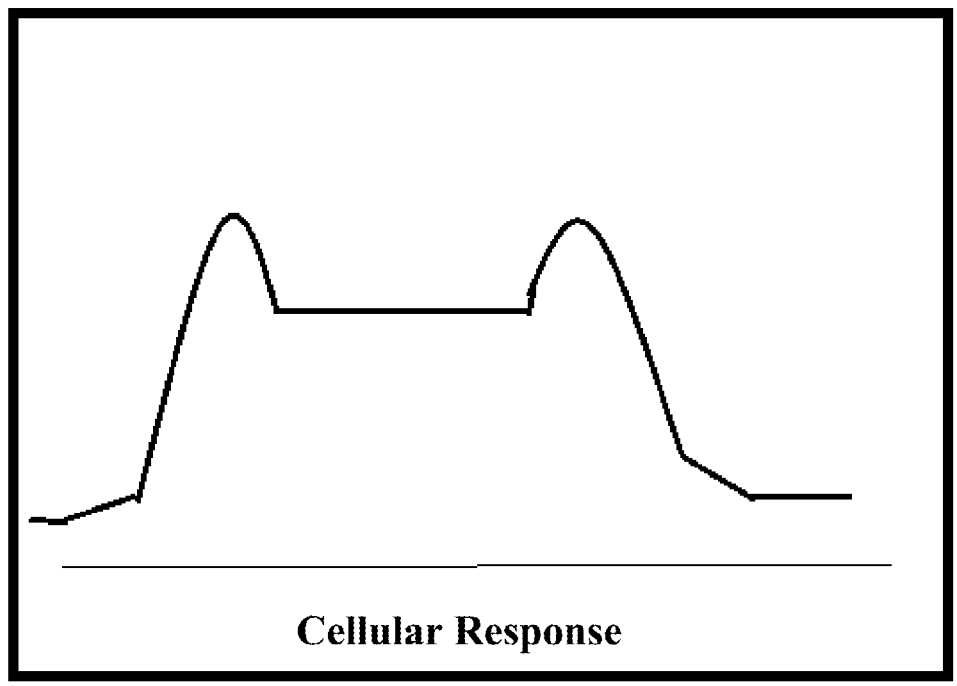

Some of the distortion issues and related cellular device 100 problems for TES 202 are shown in the frequency domain plots in FIG. 8A and FIG. 8B. As shown there, DTMF signals typically consist of a low tone and a high tone mixed together. By way of example, a DTMF 9 tone consists of a mixture of an 852 Hz low tone and a 1477 Hz high tone.

In the chart of FIG. 8A, a measurement was taken when the TES 202 was connected to a normal land line. The measurement is at the input of the DTMF decoding circuit. The two peaks in the chart represent signal content at the low and high tones. Notice that signal content away from these two peaks drops quickly. This indicates a DTMF signal with low distortion and low noise.

In FIG. 8B, the TES 202 is connected to a cellular phone line. Notice the content near the peaks does not drop away, especially between the peaks. This indicates frequency content is being transmitted between the high and low tones. If that content (and its resulting noise/distortion) is great enough, it will prevent the DTMF decoding system in the TES 202 from detecting the DTMF tone.

In the present inventions, one solution to this problem is to add additional filtering to the input to the DTMF decoder system, to reduce the noise and reduce distortion of the DTMF signal. This filtering may include a high pass and low pass filter combined, or a notch filter to reduce content between the desired tones. The goal is to reduce noise content (typically by at least 10 db) without reducing the amplitude of the desired DTMF tones.

Another solution of the present inventions is to use individual bandpass filters centered around the frequency of each DTMF tone.

Figure 9A:
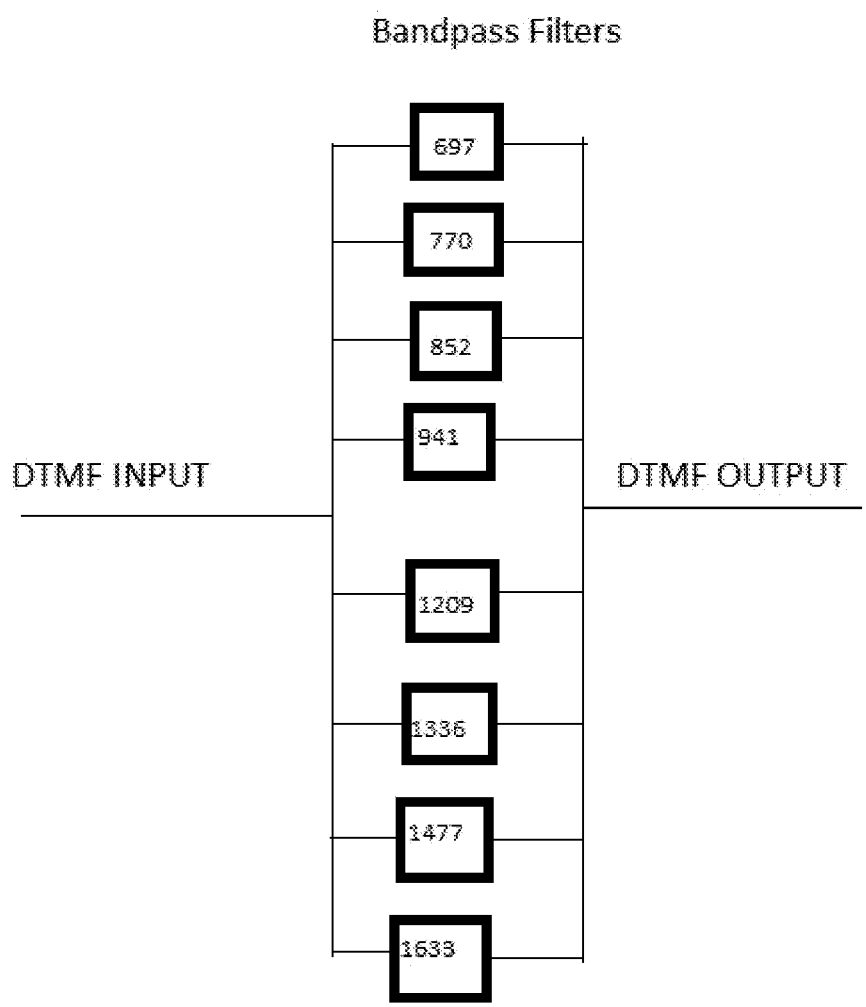
FIG. 9A shows a bandpass filter with eight (8) filters.
Figure 9B:
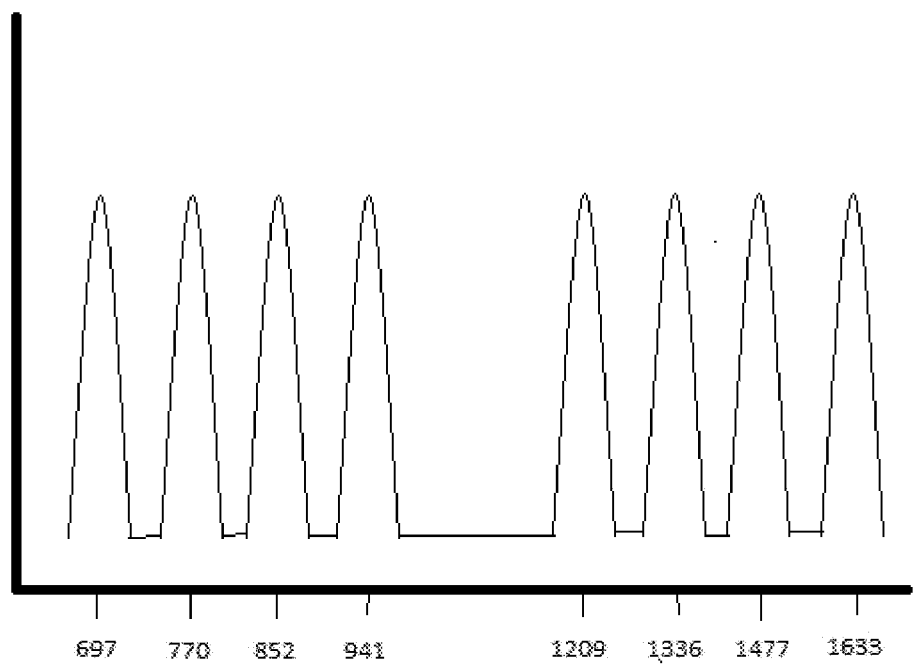
FIG. 9B shows the filter response of FIG. 9A.

FIG. 9A shows a bandpass filter with eight (8) filters. Each filter is centered at one of the normal DTMF frequencies associated with touchtone dialing. FIG. 9B shows the filter response of FIG. 9A.

Figure 9C:
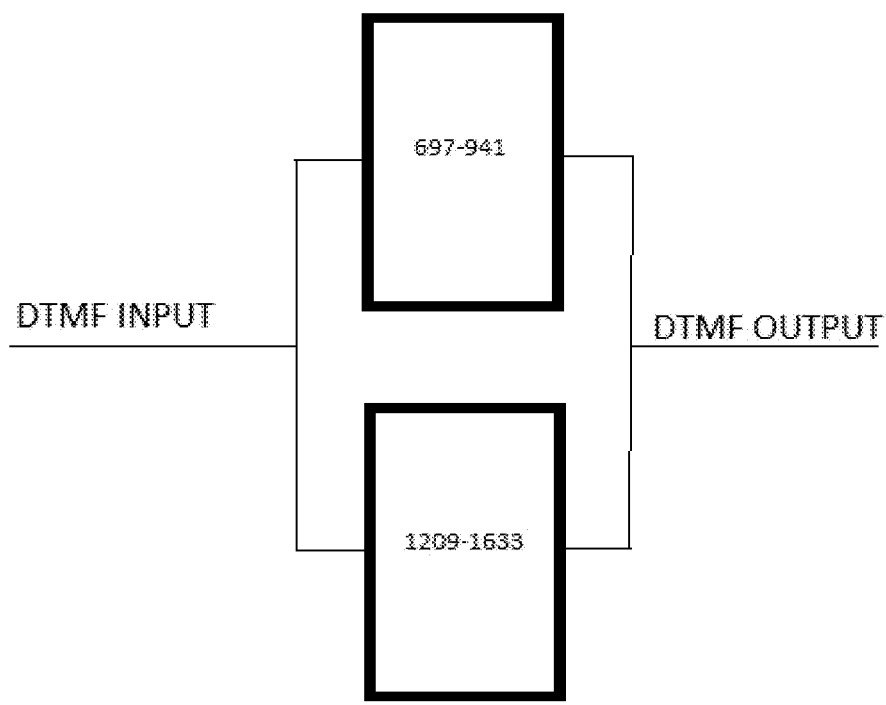
FIG. 9C shows a bandpass filter with two (2) filters.
Figure 9D:
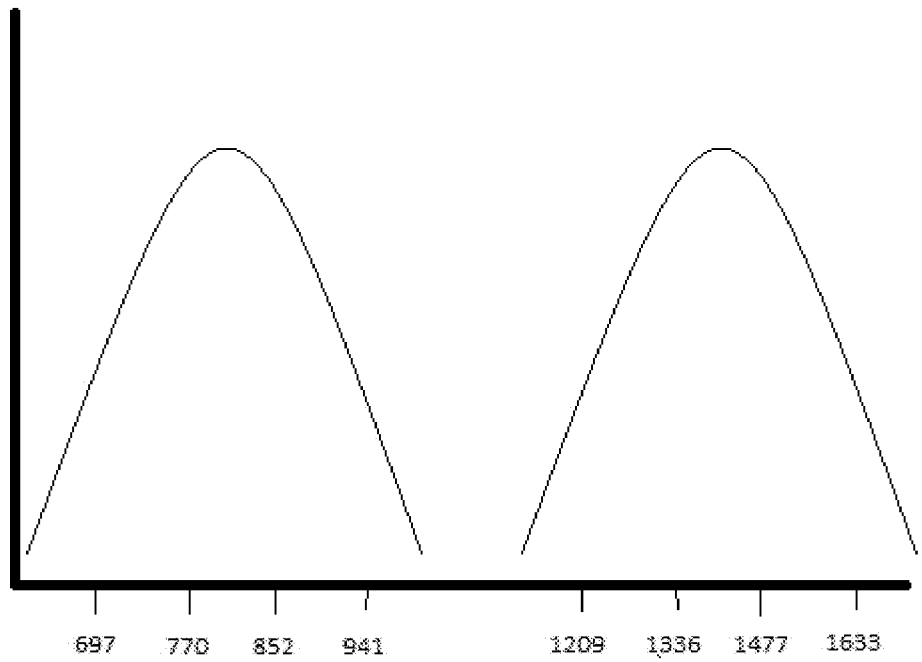
FIG. 9D illustrates the response of FIG. 9C.

FIG. 9C shows a bandpass filter with two (2) filters. One is centered on the DTMF low band of frequencies. The other is centered on the high band of DTMF frequencies. FIG. 9D illustrates the response of FIG. 9C.

Figure 9E:
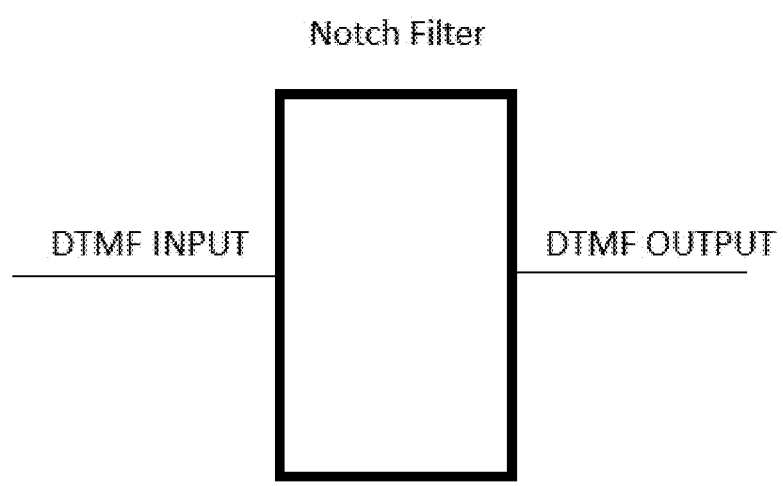
FIG. 9E is an example of a notch filter centered between the low and high band of frequencies.
Figure 9F:
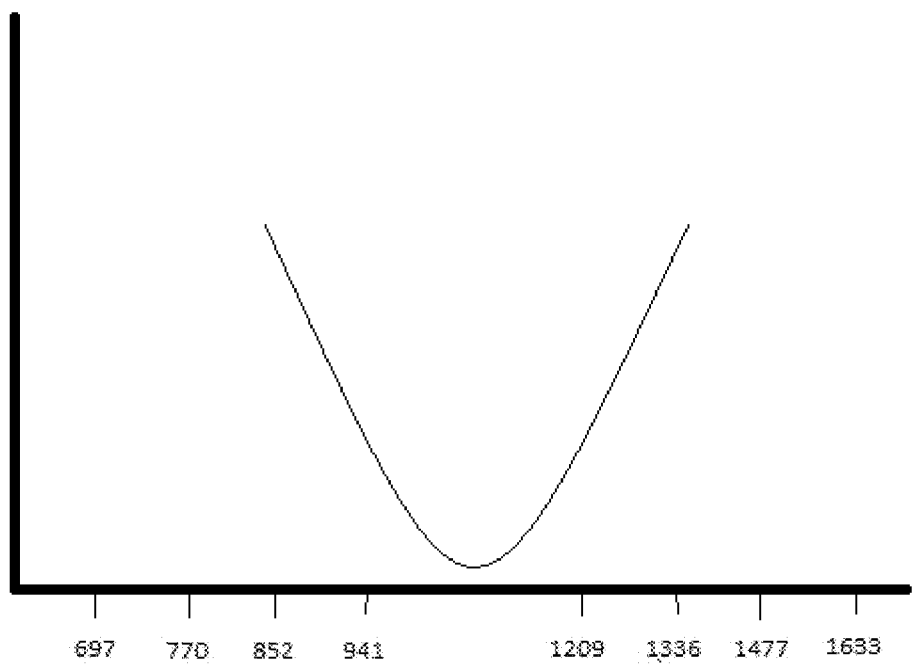
FIG. 9F shows the filter response of FIG. 9E.

FIG. 9E is an example of a notch filter centered between the low and high band of frequencies. FIG. 9F shows the filter response of FIG. 9E.

Figure 9G:
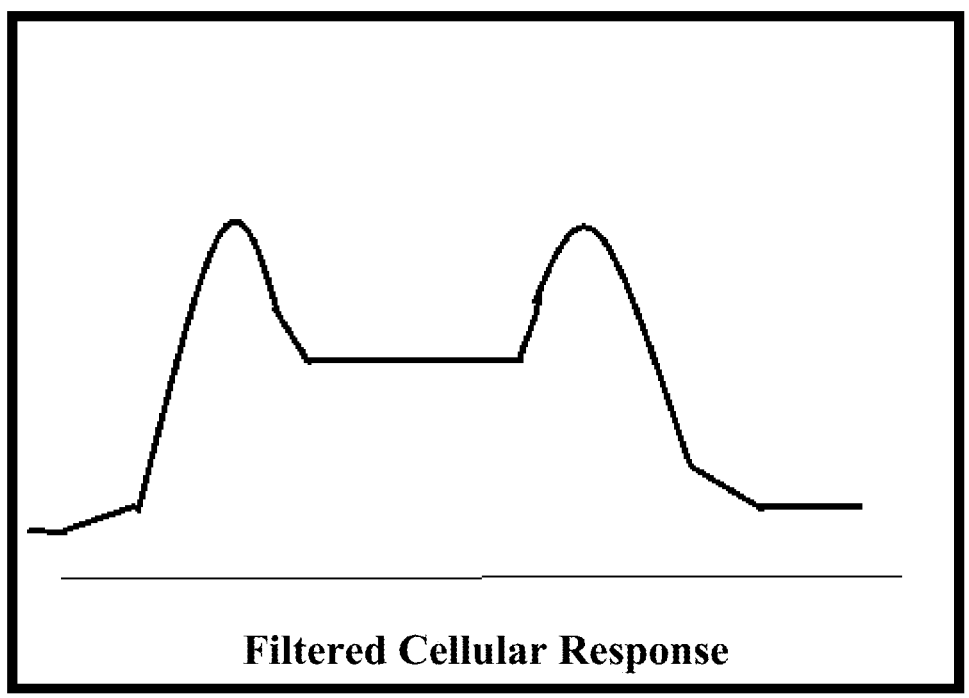
FIG. 9G shows a spectral response of a filtered cellular response.

Preferably, any one or a combination of these filters results in the spectral response as shown in FIG. 9G, in which the noise is lower with respect to the desired DTMF tones for detection by the TES's 202 DTMF decoding system.

Persons of ordinary skill in the art will understand that other filters topologies or other technologies may be employed to address this problem. Without limitation, these include op amp active filters, switched capacitor filters, and/or passive filters. Some of these may require steep cut off frequencies so that undesirable noise is reduced while the desired tones are passed along to the DTMF decoder system.

Alternative Cellular Network

Client Mode Network

Among the many aspects of the present inventions is a client mode network. In this arrangement, the cellular TES 202 takes the role of the "client," and the remote computer/server takes the role of a server when communicating with the cellular TES 202. In such a client mode model, the client cellular telephone entry systems 202 initiates contact with the remote server and requests service. The server responds to these requests for service.

Preferably, the IP address of the remote computer/server is static and never changes. Alternatively, the client may locate the IP address of the remote computer/server through any suitable means, such as by using the DNS (Domain Name Services) available as a standard feature of the general Internet.

Also preferably, the remote computer/server resides on the general Internet. A client cellular TES 202 makes a service request to the remote computer/server, and these requests are transmitted in a normal manner from the cellular data network to the general Internet and then to the remote computer/server. Server responses preferably are transmitted back through the general Internet, to the cellular carrier data network and then back to the cellular TES 202 "client" in a normal fashion. Under this model, the server preferably may not contact the TES 202 client except in response to a service request from the TES 202 client. In addition, because the IP addresses of the client preferably is dynamic and therefore may change from time to time, the remote computer/server may not know (at all times) the client's IP address, and therefore may only be able to communicate with the client TES 202 in response to a request from that TES 202.

End users (typically remote or at least not directly connected to the TES 202) may contact the remote computer/server in any suitable way (via Internet, text, dial-up, modem, etc.), to transfer data and/or instructions that will then be sent to and/or from the cellular TES 202. Some of these ways of contacting include:
  i. A dedicated program designed for the TES 202 may reside and run on the user's computer (a local PC, tablet, cellphone, etc.). Preferably, this program facilitates data entry, stores the database on the user's computer/system, and transfers the data to and from the remote computer/server, and the remote computer/server then transfers the data to/from the cellular TES.
  ii. The data base for the cellular TES 202 may reside on the remote computer/server. An end user may use a PC, smartphone, or other computing/communication device (using a dedicated program on their local computer/smartphone/etc. or using an Internet browser or other technology) to access the database on the remote computer/server, allowing the user to direct (a) data entry/updating and retrieval as between the end user's program/browser/etc. and the remote computer/server, and (b) the related transfer of data between (to and/or from) the remote computer/server and the cellular TES 202.

Preferably in such a client model, when an end user wishes to transfer data to or from a cellular TES 202, the user signals the remote computer/server using any conventional technology or methodology. Since the remote computer/server is unable to initiate communication with the cellular TES 202 in a client model, however, apparatus and/or methods are needed to signal the cellular TES 202 to contact the remote computer/server. A number of methods are available including:
  i. the remote computer/server calling the cellular TES 202 and using DTMF signaling to request that the cellular TES 202 contact the remote computer/server.
  ii. the remote computer/server calling the cellular TES 202 and the call alone (without DTMF signaling) serves as a request that the cellular TES 202 contact the remote computer/server.
  iii. the remote computer/server sending an SMS (text) message to the cellular TES 202 requesting that the TES 202 contact the remote computer/server.
  iv. the cellular TES 202 contacting the remote computer/server on its own, such as by programming the TES 202 to do so at a repetitive/periodic time. Under this approach, preferably the timing and other variables (length of time, interval for contact, etc.) related to the TES 202 contacting the remote computer/server can be varied, by the user, an installer of the TES 202, or other person. In certain embodiments of the inventions, a plurality of TES 202 systems may be contacting a single remote computer/server, and depending on the settings for the time/period/etc. of those contacts, the remote computer/server may become overloaded. Accordingly, as part of the protocol between the remote computer/server and the cellular TES 202 systems, the time of the periodic timer may be changed, so that the respective TES 202 systems may be staggered in their requests, and/or their time may be lengthened to increase the time between requests (when the remote computer/server is busy or otherwise) and shortened when the remote computer/server is not busy.

Preferably, the cellular TES 202 functioning as a client then contacts the remote computer/server and the data transfer then takes place.

Remote Computer/Server

Preferably, under certain embodiments of cellular server models, the remote computer/communications server is a computer which is connected to both the private cellular network and the general Internet. It functions as a client to the cellular devices 100/telephone entry systems 202 on the cellular network, and also functions a server on the general Internet (for end users wanting to access/control/manage/etc. their respective TES 202 system(s)), and acts as a "bridge" between the two networks. In other words, preferably the remote computer/server interfaces between end users (or other persons) and the related TES 202 systems deployed at remote physical locations. Under such cellular server models, the database may be stored on the remote communications server, and it may be controlled by end users and/or other persons by any appropriate and convenient apparatus and methods, including without limitation a browser or app, running on the end user's computer, cellphone, tablet, etc.

Preferably, the main data transfer functions of this remote computer/server include at least the following:
  i. It is the only contact point with any of the cellular devices 100/TES 202 systems deployed on the cellular network. All data transfers to and from these deployed devices must pass through this remote computer/server.
  ii. It is connected to the cellular carrier via the general Internet, using a VPN or similar apparatus/methods.
  iii. It is the collection point for data transfers requests from "end users" on the general Internet. Preferably, these users have specially designed software running on computers generally known as database software. Preferably this software is designed for the entry of data tailored to be used with the deployed TES 202 systems on the cellular network.
  iv. When an end user wishes to transfer data to or from a selected TES 202 on the cellular network, the request and/or database is sent from the user's computer via the general Internet to the remote computer/server.
  v. The remote computer/server formats the data (if needed), makes contact with the selected cellular device 100/TES 202 via the VPN/other system and the cellular network, and then transfers or receives the database/data/commands.
  vi. Preferably during this time (after the end user has sent the data/other to the remote computer/server), the end user's computer or other communication device is periodically polling the remote computer/server to check on the status of the database transfer. When that transfer is complete, a successful message is delivered to the end user's computer/device. If a problem occurred and/or the transfer otherwise was not successful, a "problem message" is delivered to the end user rather than (or in addition to) the "successful" message. If the end user requested that data be retrieved from the TES 202, the received data is delivered to the end user's computer.

Preferably, under certain embodiments of cellular client models, the remote computer/server is a computer which is connected to the general Internet. It functions as a server to the cellular devices/telephone entry systems on the cellular network, and also functions a server on the general Internet (for end users wanting to access/control/manage/etc. their respective TES system(s)). In other words, preferably the remote computer/server interfaces between end users (or other persons) and the related TES systems deployed at remote physical locations.

Preferably, the main data transfer functions of this remote computer/server include at least the following:
  i. It is the only contact point with any of the cellular devices/TES systems deployed on the cellular network. All data transfers to and from these deployed devices must pass through this remote computer/server.
  ii. It is connected to the cellular carrier via the general Internet.
  iii. It is the collection point for data transfers requests from "end users" on the general Internet. Preferably, these users have specially designed software running on computers generally known as database software. Preferably this software is designed for the entry of data tailored to be used with the deployed TES systems on the cellular network.
  iv. When an end user wishes to transfer data to or from a selected TES on the cellular network, the request and/or database is sent from the user's computer via the general Internet to the remote computer/server.
  v. The remote computer/server formats the data (if needed), and then using a possible number of methods prompts the client cellular entry systems to contact it. The methods may include placing a telephone call to the entry system and giving it a command to contact the remote communications server. Placing a telephone call with no DTMF commands. Sending a SMS message prompting the entry system to contact the server. Or just waiting for the client entry system to contact the server at a periodic time.
  vi. Preferably during this time (after the end user has sent the data/other to the remote computer/server), the end user's computer or other communication device is periodically polling the remote computer/server to check on the status of the database transfer. When that transfer is complete, a successful message is delivered to the end user's computer/device. If a problem occurred and/or the transfer otherwise was not successful, a "problem message" is delivered to the end user rather than (or in addition to) the "successful" message. If the end user requested that data be retrieved from the TES, the received data is delivered to the end user's computer.

If the database is stored on the remote communications server, the end user can check with the server using the browser on their PC, smartphone, tablet, etc. for the transfer status.

Billing Features of the Remote Computer Server.

Using a cellular carrier's services (such as is done in certain embodiments of the present inventions) requires payment to the cellular carrier. Cellular services typically are sold with monthly limits on usage, either in minutes (of voice usage) and/or megabytes (of data usage). Those same "billing" concepts can apply to certain embodiments of the present inventions.

In those embodiments, when a user elects to have cellular voice and/or data service for their cellular TES 202, it typically is not known how much voice and/or data the TES 202 will use. Larger buildings with more visitors typically will have more TES 202 phone calls and/or more voice minutes. In addition, a larger building will generally require more data usage; among other things, more residents will move into and out of the property more often, requiring the entry system 202 database to be updated more often, thereby using more cellular data.

Various types of billing/plans typically are available for cellular service, and typically any usage over the plan limits results in additional charges for those "extra" services. In certain embodiments of the present inventions, a newly registered cellular TES 202 will be placed into the least expensive available voice and data level, but as further discussed herein, various embodiments of the inventions preferably monitor the TES 202 bills and usage and modify the cellular plans to reduce subsequent charges from the relevant cellular service provider. In other words, the present inventions preferably include methods and apparatus related to monitoring and reducing the billing charges for cellular services, and for otherwise managing the economics related to the various systems and cellular charges involved.

Among other things, preferably the remote computer/server provides the ability to register users and enter into and/or administer cellular service contracts related to those users, using a non-transitory computer readable medium. Preferably, the cellular carrier charges the remote computer/server provider for the relevant cellular services, and that provider/reseller then charges the end user for those services.

The billing server apparatus and methods of the inventions preferably include one or more of the following features:
  i. It allows end users who wishing to use cellular telephone and/or data service for their TES 202 to register and create an account.
  ii. It allows information needed for the account to be entered (such as name, address, phone number, email address, etc.).
  iii. It allows selection by the end user of a billing method (for payment by the end user to the remote computer/server provider), such as credit card, electronic bank withdrawal, or paper invoice/check.
  iv. It interfaces to a credit card processing company to process credit card billing and checking account withdrawal.
  v. It provides a method for the end user to view statements online.
  vi. It interfaces to the cellular carrier to allow the turning off and on of cellular service.
  vii. It interfaces to the cellular carrier to receive detail calling and data use information for any particular cellular device 100/telephone entry.
  viii. During initial registration of new cellular service or otherwise, it allows the end user to receive a local phone number for the cellular device/entry system 200, based on location.
  ix. During initial registration, it allows the user to enter the SIM ID number from the cellular device 100 to bind the cellular device 100 and the account on the server together.
  x. It allows the end user to see detailed voice and data usage for a cellular entry system 202 for a past billing period.
  xi. It prints paper invoices for mailing to end users.

Reducing Cellular Billing

Preferably, the remote computer/server is configured to select the best (most economic or other criteria) voice/data cellular plan for each cellular device 100/TES 202. As noted above, various types of billing/plans are available for cellular service. A common billing scheme is for the cellular carrier to offer a number of voice minutes and/or data byte quantity plans at different prices. Below are examples of a number of different billing levels offered, and each may be at a different price/month:
  i. 0-100 minutes voice and 1 megabyte of data.
  ii. 101-450 minutes of voice and 10 megabytes of data.
  iii. 451-1000 minutes of voice and 10 megabytes of data.
  iv. 0 voice minutes and 10 megabytes of data.

Other levels may also be offered. Typically, higher voice and/or data limits are billed from the cellular carrier to the remote computer/server reseller at relatively higher prices. In addition, if a TES 202 is placed in one of the above plans and the voice or data usage exceed the plan limits, then (as mentioned above) the cellular carrier will add "overage" charges to the relevant billing period. These overage charges are usually quite high, therefore it is beneficial economically that each TES 202 be in the proper plan based on the voice and data usage for minimum costs billed to the reseller.

Preferably, the present inventions include pooling some or all of the voice minutes and/or data bytes usage over a given billing level. By way of example, in an embodiment two entry systems may be enrolled on a monthly contract with a cellular carrier, in the 0-100 minute voice and 1 megabyte data level. If one of those systems uses 150 minutes of voice and 1.5 megabytes of data, while the second system uses only 40 minutes of voice and 0.2 megabytes of the data, no overage charges will occur since the total for the two system is not over the combined contract amount (for the two contracts) of 200 minutes voice and 2 megabytes data.

Also preferably, in certain embodiments of the invention a cellular carrier bills the remote computer/server/reseller monthly for voice, data, and/or overages. Typically, the billing level for a given cellular TES 202 is the same throughout the billing period (it is billed by the cellular service at that same "contract" level for the entire month or other billing cycle). Although a TES 202 may be "moved" from one billing level/plan to another during a given billing period, such a change typically will not take effect (or be reflected in the billing from the cellular provide) until the beginning of the next billing period.

Preferably, in certain embodiments of the invention, the billing module/apparatus/methods review the data for all cellular TES 202 systems on a regular basis, such as reviewing the data for the past month on the last day of the billing period. Based on the results of this review/algorithm, described in more detail below, TES 202 systems/contracts/plans preferably are moved, if appropriate, to a higher billing/usage level for the next billing cycle, to minimize any "overage" usage and related higher billing charges to the remote computer/server/reseller for the following month.

Other Features of the Remote Computer/Server.

As suggested above, for certain embodiments of the inventions, preferably if the remote computer/server is unable to communicate with a cellular device/entry system over the cellular network because of a lack of network connectivity, the server will dial the telephone number of the cellular device 100 and, using DTMF programming or other technology, will command the cellular device 100 to refresh or renew the power to the cellular device 100 or router 400, causing the cellular device 100/router 400 to re-connect with the cellular network. Following that refresh/renew effort, the remote computer/server preferably will make a second attempt to communicate with the TES 202 over the cellular network.

Preferably, service personnel also may use the remote computer/server to remotely log into the cellular device 100, cellular router 400, or Ethernet to RS232 converter 420, for configuration and/or maintenance or other actions. Also preferably, the remote computer/server may be used to send pop up messages to users via the special database software running on the end users' local computers. These messages may alert the user to service problems, new features, advertisements, service outages, etc.

Voice and Data Services Provided Based on the Type of Entry System

Voice Only

Certain embodiments of the inventions may be relatively simpler than others, and may be configured so that they are required to be programmed locally via the keypad physically on the TES unit (so that the "database" is programmed and maintained/updated locally, rather than via uploading/downloading the database data through a telephone connection. Examples of such less expensive TES systems are those for small buildings that require few changes to the database. A voice only cellular plan can be preferable for such installations and embodiments.

Voice and Data

More common embodiments will benefit from cellular plans (and related apparatus and methods) that include both voice and data transmission over the cellular link. These entry systems can be used in a wider variety of ways, including by way of example and not by way of limitation, allowing a visitor to make a voice phone call to a resident, and controlling the building elevators so that visitors may only go to the floor on which the relevant/authorizing resident lives. In certain embodiments, card readers and other access control devices may be connected to the TES to control resident access into and/or through a building. Such systems may, by way of further example, permit control of a locked swimming pool gate so that it may only be opened between certain hours. These systems typically have an electronic display to display tenant names for visitors to scroll through. These systems are also more practical for larger buildings which may require frequent database changes, make manual/local input too burdensome. These situations benefit from instead using a "remotely located" database to create and maintain the relevant (and more complicated and voluminous and dynamically-changing) data.

Data Only

Some TES systems do not need or use voice at all. One example is if a company has a receptionist during office hours. In such a situation, there is no need for a visitor to "call" someone when they visit the company, they instead simply walk up to the receptionist. That same company/facility may have many doors, however, some of which are controlled by card readers, keypad, transmitters, or other security devices. All other entry doors into the building or facility (besides the front door that leads to the receptionist) may be controlled and/or secured, so that only authorized/credentialed employees may enter using their access cards. Some unauthorized person walking in off the street may not enter the facility. In addition, the employees may not be permitted to enter during certain hours, such as when the business is closed. Certain especially secure areas (such as computer/IT/research rooms or department may similarly have card readers on the doors allowing only certain employees to enter. Preferably such "data only" systems or installations/embodiments can benefit from the present inventions and be used for some or all of the other features described herein except voice calls. In any case, such installations/embodiments of the present inventions only need a data plan, and there is no need to pay for "voice" functionality over the cellular connection.

Cellular carriers typically offer three types of plans that correspond to the foregoing: voice only, voice and data, and data only. Depending on the type of installation/embodiment being used at a specific location/building/etc., a corresponding cellular plan can be selected. Thus, for embodiments in which a remote computer/server provider is positioned between the end user and the TES, that provider can likewise offer to the end user any of or an appropriate one of those three types of TES systems and related cellular plans.

As discussed elsewhere, various embodiments of the inventions can include the relevant cellular device 100 (voice, voice/data, data only, etc.) being external or internal/integrated with the main TES assembly. Among the many ways to provide voice only TES "external" systems is to provide the same "voice and data" cellular device 100 but omit all components for delivering data. For a data only device, embodiments can include actually using the same device/apparatus as the "voice and data" described elsewhere, but simply not using the voice components. Voice typically requires so little support hardware that it may be more economic to not carry/provide a separate model "without" the voice hardware.

In passing, for multiple entry points at a single location, TES systems can be installed with a single telephone connection and hard-wiring or other communication between those multiple entry points (such as a front and back gate to an apartment complex). In other embodiments, an end user may elect to instead have two separate cellular TES systems, one connected via a first cellular connection at the front gate (or other entry/control point) and the second connected via a second cellular connection at the second gate (or other entry/control point). Such embodiments reduce or eliminate the need for hard-wiring or other communications between the two (or more) entry points.

Algorithm for Globally Optimized Billing Tier Assignment for Voice and Data Usage Preferably for certain embodiments, the invention includes methods and apparatus for reducing or minimizing the charges that must be paid for the cellular service being used in the respective embodiment. Although many or even most of these inventions can be used by individual end users in situations in which they directly contact the TES cellular device, some of these inventions are especially valuable for embodiments in which a third party (such as a remote computer/server/reseller) is positioned between the end user and the cellular TES. In such embodiments, the reseller can effectively purchase cellular voice and/or data services from a cellular carrier for resale to end-users of cellular telephone entry systems. Preferably on the same fixed day each month ("billing day"), the cellular carrier invoices the reseller for all voice and/or data usage during the preceding month. The month's charge for each cellular entry system is determined by the billing tier/plan to which the reseller has assigned that TES as of the preceding billing day, and there may be additional per-tier overage charges for voice and/or for data. Also preferably for embodiments in which a third party (such as a remote computer/server/reseller) is positioned between the end user and the cellular TES, the relationship between the cellular carrier and the third party/reseller is structured to allow economic "pooling" of the cellular services. For example, the cellular carrier defines the billing tiers by specifying each tier's voice and data usage limits per entry system, and the fixed cost per entry system for that tier. Additionally, overage charges typically are levied when the aggregate usage (voice or data) of all entry systems in a tier exceeds the aggregate limit for that tier (i.e. the per-entry system usage limit multiplied by the number of entry systems in the tier). A fixed cost is billed for each voice minute or data megabyte over the tier's aggregate limits.

As indicated above, preferably certain embodiments of the inventions include apparatus and methods to minimize the billing of the reseller (or the end user or other relevant person) by the cellular carrier for the relevant TES usage. An example of an algorithm is described below that attempts to do that by assigning billing tiers (for the upcoming billing cycle or the previous "just ending" billing cycle, if the carrier permits this to be done) just before billing day, when entry system usage data for the previous month is available and therefore can be used to indicate actual usage that is about to be billed and/or likely usage for the next billing period. For installations that have been operating for extended periods, such calculations can include other factors, such as seasonal fluctuations and the like. The algorithm and related data can conveniently be stored and/or processed through a non-transitory computer readable medium. If the carrier permits, the algorithm can be run just before the carrier's "close" of the billing cycle and be effective for that just-ending cycle. If the carrier does not permit that flexibility, the process can be undertaken prospectively, as a projection attempting to estimate and reduce the charges for the next upcoming billing cycle.

Cellular Carrier Billing Tier Structure

Below is an example of a tiered billing schedule. An appropriate algorithm can be applied to any arbitrary schedule defined by these elements.

TABLE 1

SampleTiered Billing Schedule

| Tier Name | Data: MB Limit | Voice: Min. Limit |
|---|---|---|
| 0 MB 100 Min | 0 | 100 |
| 0 MB 450 Min | 0 | 450 |
| 0 MB 1200 Min | 0 | 1200 |
| 0 MB 2500 Min | 0 | 2500 |
| 0 MB 5000 Min | 0 | 5000 |
| 0 MB UnlimitedMin | 0 | (unlimited) |
| 1 MB 100 Min | 1 | 100 |
| 10 MB LTE | 10 | 0 |
| 10 MB 450 Min | 10 | 450 |
| 10 MB 1200 Min | 10 | 1200 |
| 10 MB 2500 Min | 10 | 2500 |
| 10 MB 5000 Min | 10 | 5000 |
| 10 MB UnlimitedMin | 10 | Unlimited |

The Optimization Process

Preferably the algorithm computes and compares at least three different optimization techniques, and selects the one that results in the lowest overall cost to the reseller. Examples of such approaches are described below.

Optimization Technique #1: Best Fit Per Sim

This is a relatively simple optimization. It ignores all aggregates and only looks at one entry system at a time. The entry system is assigned to the lowest-cost tier for which it exceeds neither the voice nor the data limit. There is no possibility of overage charges as each tier's aggregate usage is guaranteed to be at or below the aggregate limit. For example (using Table 1 above), an entry system that used 380 voice minutes and no data would be placed in tier 0 MB450 Min, and an entry system that used 380 voice minutes and 1 MB of data would be placed in tier 10 MB450 Min.

Optimization Technique #2: Best Aggregated Fit Per Tier

Under this approach, the algorithm preferably attempts to add as many entry systems as possible to each tier, in ascending order of tier cost, as long as the added cost of the entry system is less that it would be if that entry system were added to a higher-cost tier after taking overage into account.

To use this technique, preferably all entry systems initially are placed in a single 'unassigned' list, sorted primarily by data and secondarily by voice usage, in ascending order. Each entry system will be removed from the 'unassigned' list when it is assigned to a billing tier, until the list becomes empty.

Next, tiers are grouped by feature (data-only, voice-only, data+voice) and each group is sorted by cost, from low to high. For each tier group, for each tier in that group in order, each entry system remaining in the 'unassigned' list is inspected in order. If the entry can be added to the tier without exceeding the aggregate voice or data limits, it is removed from the list and assigned to the tier. If not, the cost of adding the entry system to any higher-cost tier within the same group is computed, and if the cost of adding it to the current tier including overage charges is still lower than the cost of assigning it to any higher tier then the entry system is removed from the list and assigned to the current tier.

When all entry systems have been assigned a tier, the 'unassigned' list is empty and this embodiment of the optimization process is complete.

Optimization Technique #3: Best Aggregated Fit with Cramming

This embodiment of a billing optimization attempts to improve on Technique #2 by 'cramming' all assignments for the set of tiers that share the same non-zero data limit into a single tier. It can provide better results in certain circumstances, such as when voice minute usage is a more significant cost factor than is data usage. It starts with the results of Optimization #2 above. Using the example in Table 1, the only set of tiers to be modified would be the ones with a 10 MB data limit. So for each of these tiers (10 MBLTE—10 MBUnlimitedMin), the cost of assigning all entry systems from all of these tiers into that one tier is calculated (per-entry system costs plus overage), then all entry systems from that set of tiers are re-assigned to that tier with the lowest calculated cost.

Best Optimization Technique is Selected

The resulting costs of the three optimization techniques are compared, and the lowest-cost solution of the three is chosen.

Other Features of Using Cellular Instead of a Traditional Landline to Provide the Telephone Voice and Data Connection to the Entry System Wiring Costs In a typical entry system installation, the location of the traditional land line on the property is not in the same location as the TES. Typically the land line is located in an equipment closet somewhere a long distance from the TES, because the TES is typically positioned near the gate/door/other feature being controlled. Wiring means such as conduit, trenching, etc. must be used to run and protect the land line telephone wire between these two locations. Because cellular is wireless, the cellular device 100 may be placed in or very near the TES location, or even be internal or integrated into the TES. By its nature, the cellular device 100 does not need "land line" wiring, and thus cellular TES systems eliminate most of the costs, including parts and labor, to install this wiring.

That labor for using land lines sometimes includes burying the connecting wire(s) in the ground. Telephone wiring that is run underground is very likely to be contaminated with water. Eventually all underground conduits fill with water. This water can short out the telephone wiring, causing electrical noise and hum on the TES lines. Again, cellular systems eliminate this risk because there is no underground telephone wiring.

Hard wired systems have other problems. If the telephone wiring is located near other voltage sources such as electrical wiring, transformers, utility wires, electrical motors, fluorescent lights, or other sources of electrical noise, the wiring/system is prone to picking up noises and hums, making it difficult to converse over the entry system.

The above noise is also very problematic when trying to use an analog modem to transfer data to and from the entry system. Analog modems require a clean, quiet telephone line to work properly. Noisy land telephone lines cause the analog modem to make data errors and cause failures to transfer the data correctly.

Copper land telephone line also are susceptible to electrical surges and lightning. If the telephone wires are located near electrical equipment that generates high voltage surges, the surges may enter and cause damage to the TES. Similarly, because the telephone land line may run several miles from the TES location, through the streets and telephones poles in the area, lightning may strike these wires causing a surge to travel along the wires to the TES, causing damage to the TES.

All of these problems are eliminated or reduced because the cellular system does not have the land line connection.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments. Thus, the present invention is not intended to be limited to the embodiments shown herein but is to be accorded the widest scope consistent with the principles and novel features disclosed herein.

The invention claimed is:

1. Apparatus for controlling physical access to allocation, comprising:
    an entry system including at least one barrier at the physical location, barrier configured to selectively permit access into and/or from and/or within the physical location upon proper credentials and/or authorization;
    a cellular device connected to the entry system, the cellular device configured to transmit and receive voice and data information over a cellular network, and to communicate that information to the entry system, wherein the cellular device is a modular unit that is external to the entry system or is integrated internally into the entry system; wherein
    the voice and data information includes the credentials and/or authorization related to access to the physical location;
    a timing device for maintaining the cellular device in an 'on'position; and
    a power renewing feature configured to renew power to the cellular device when a set duration of time expires on the timing device.

2. The apparatus of claim 1, wherein the power renewed to the cellular device establishes a voice and data connection with the cellular network and resets the timing device to the set duration of time.

3. The apparatus of claim 1, wherein voice and/or data information transmitted and/or received by the cellular device establishes a voice and data connection with the cellular network and resets the timing device to the set duration of time.

4. The apparatus of claim 1, the cellular device further including a processor configured to transmit a data message to establish a voice and data connection with the cellular network and reset the timing device to the set duration of time.

5. The apparatus of claim 1, further including a remote communication server configured to periodically transmit a data message to the cellular device to establish a voice and data connection with the cellular network.

6. The apparatus of claim 5, wherein the remote communication server may transmit an SMS message to the cellular device, the SMS message containing instructions to renew power to the cellular device.

7. The apparatus of claim 6, the cellular device further including a processor configured receive the SMS message and to transmit the data message to rest the timing device to the set duration of time.

8. Apparatus for controlling physical access to location, comprising:
    an entry system including at least one barrier at the physical location, the barrier configured to selectively permit access into and/or from and/or within the physical location upon proper credentials and/or authorization;
    a cellular device connected to the entry system, the cellular device configured to transmit and receive voice and data information over a cellular network, and communicate that information to the entry system, wherein the cellular device is a modular unit that is external to the entry system or is integrated internally into the entry system;
    the cellular device further including a call receiving feature for receiving an incoming phone call, the call receiving feature configured to refresh power to the cellular device when the incoming phone call contains instructions to refresh power; and wherein the voice and data information includes the credentials and/or authorization related to access to the physical location.

9. The apparatus of claim 8, wherein the power refreshed to the cellular device establishes a voice and/or data connection with the cellular network.

* * * * *

UNITED STATES PATENT AND TRADEMARK OFFICE
CERTIFICATE OF CORRECTION

PATENT NO.        : 10,002,480 B2
APPLICATION NO.   : 15/017357
DATED             : June 19, 2018
INVENTOR(S)       : Thomas R. Richmond et al.

It is certified that error appears in the above-identified patent and that said Letters Patent is hereby corrected as shown below:

In the Claims

Claim 1, Line 1 should read: Apparatus for controlling physical access to a location, Signed and Sealed this
Fourteenth Day of May, 2019

Andrei Iancu
*Director of the United States Patent and Trademark Office*